INVENTORS
MERLIN L. HANSON, JR.
DON M. MEYER
BY
ATTORNEY

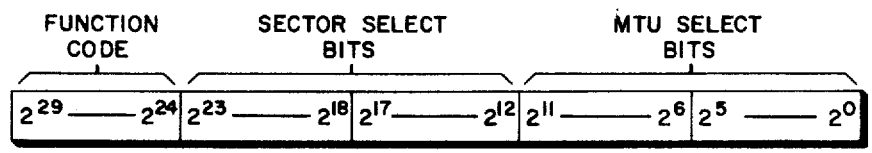
FUNCTION WORD
*Fig. 5a*
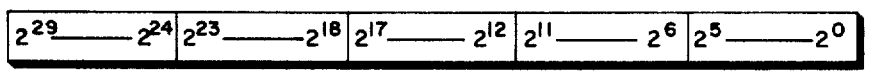
IDENTIFIER WORD
*Fig. 5b*
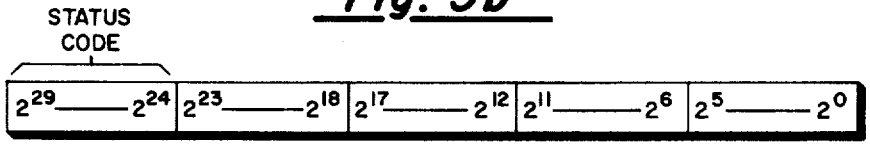
STATUS WORD
*Fig. 5c*
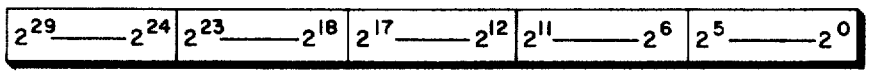
DATA WORD
*Fig. 5d*
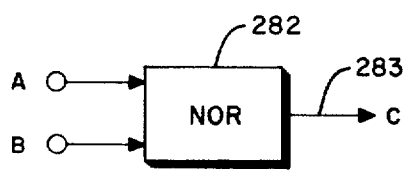
*Fig. 6a*
| A | B | C |
|---|---|---|
| 0 | 0 | 1 |
| 0 | 1 | 0 |
| 1 | 0 | 0 |
| 1 | 1 | 0 |
$C = \overline{A+B} = \overline{A}\,\overline{B} = A \downarrow B$
*Fig. 6b*

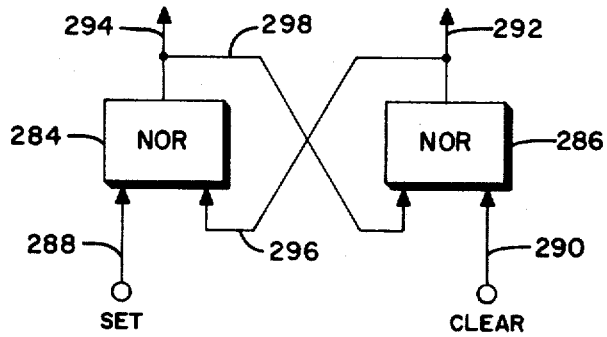
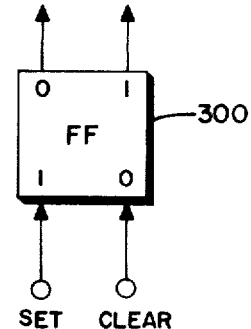
*Fig. 7a*  *Fig. 7b*
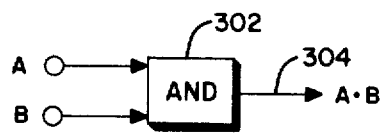
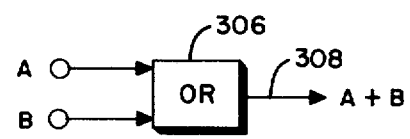
*Fig. 8*  *Fig. 9*
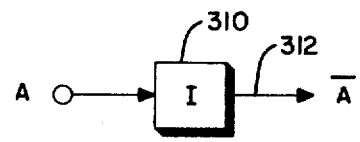
*Fig. 10*
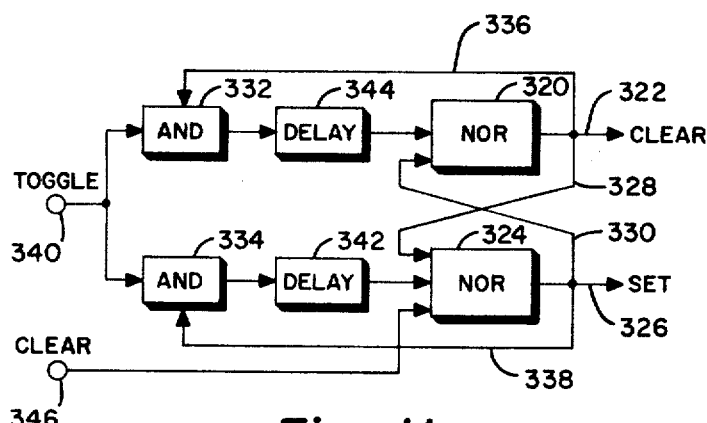
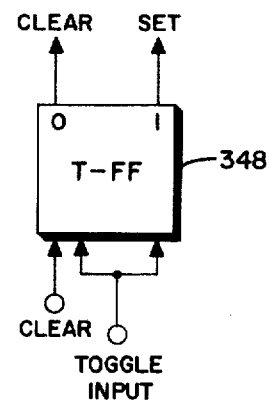
*Fig. 11a*  *Fig. 11b*

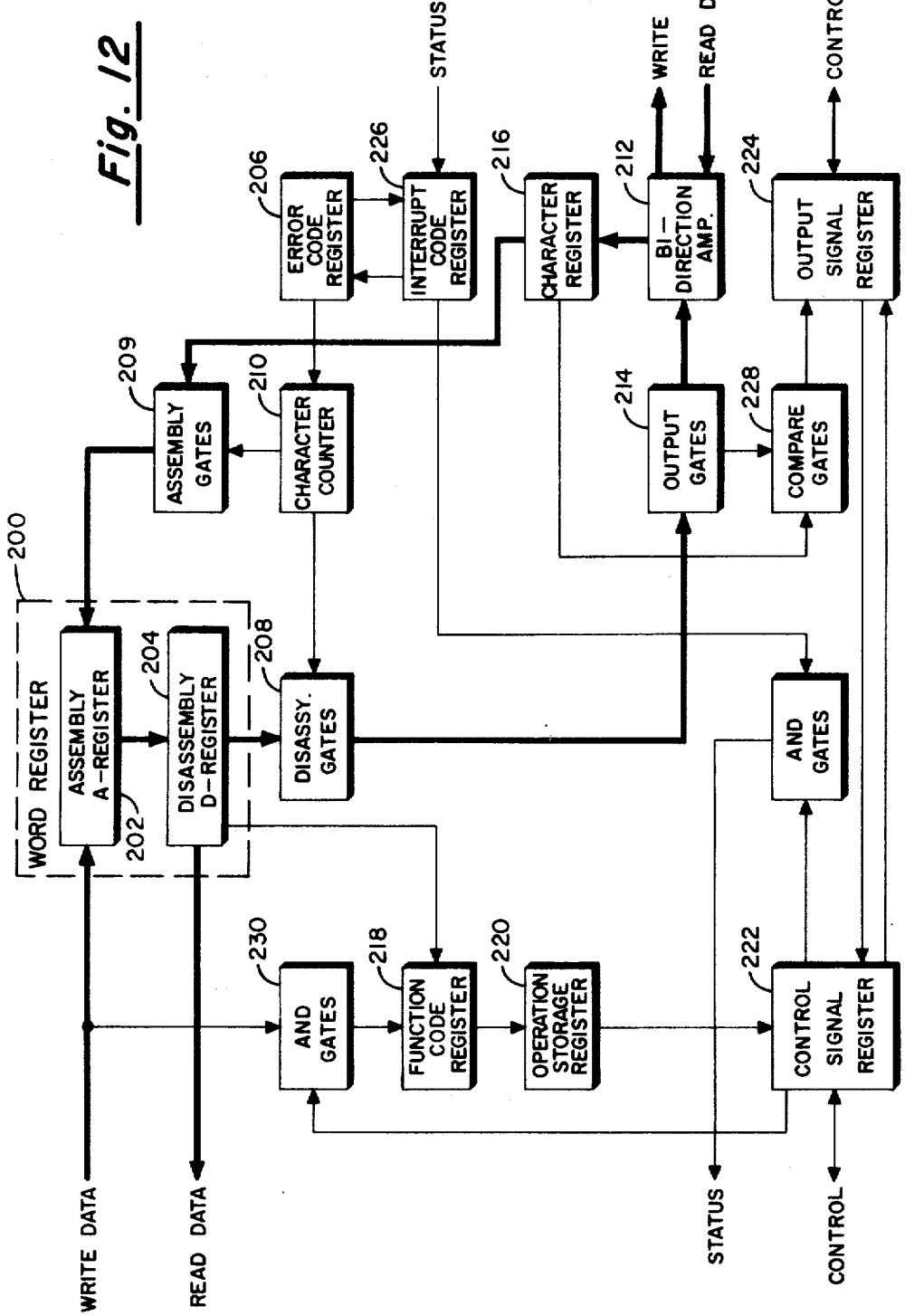

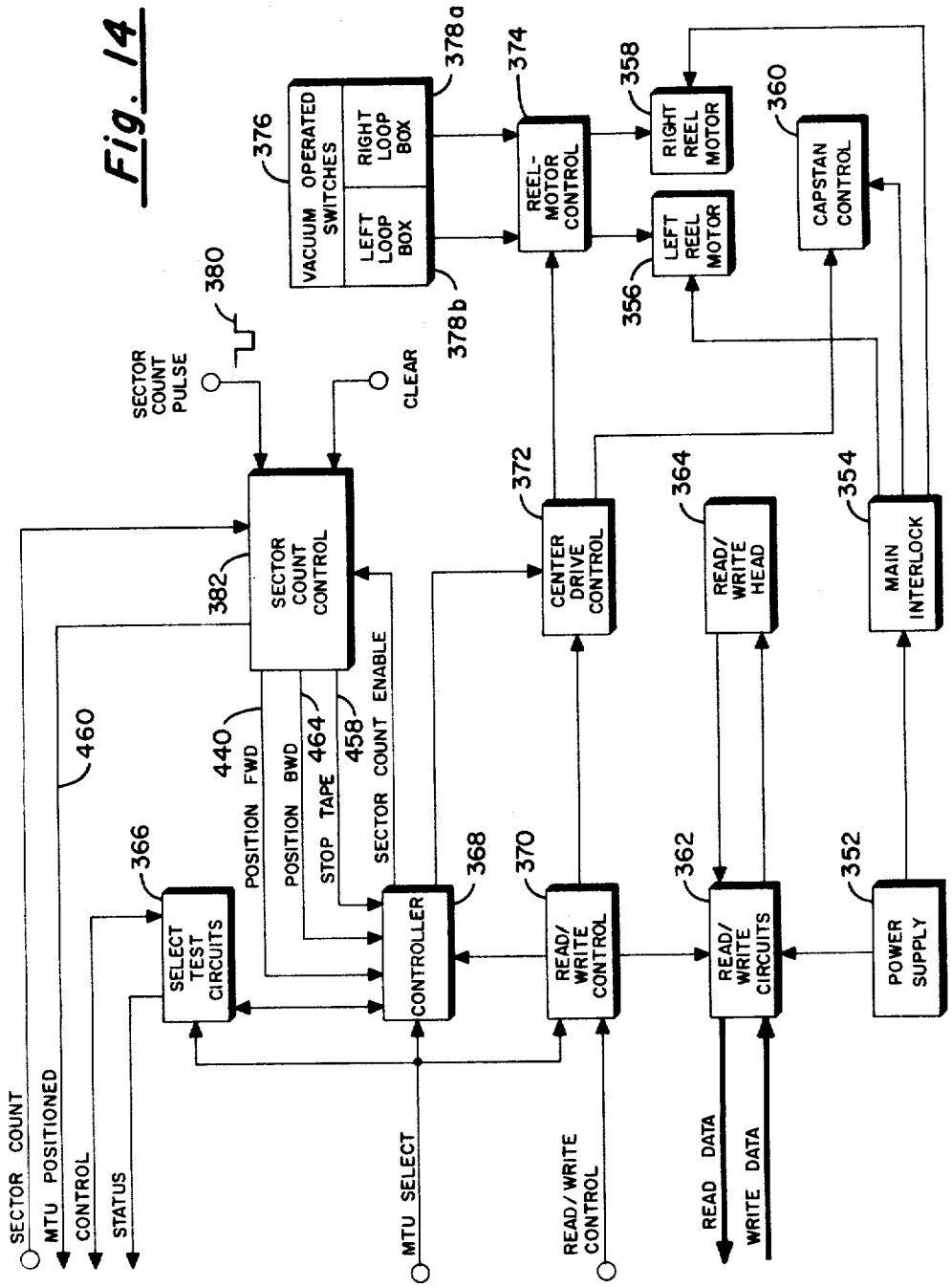

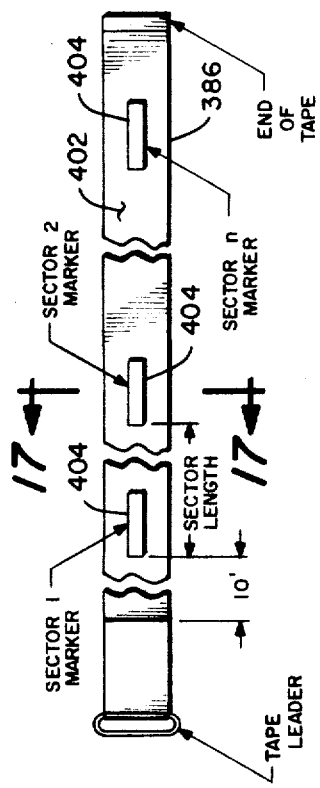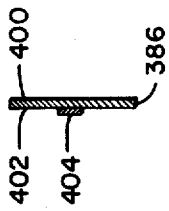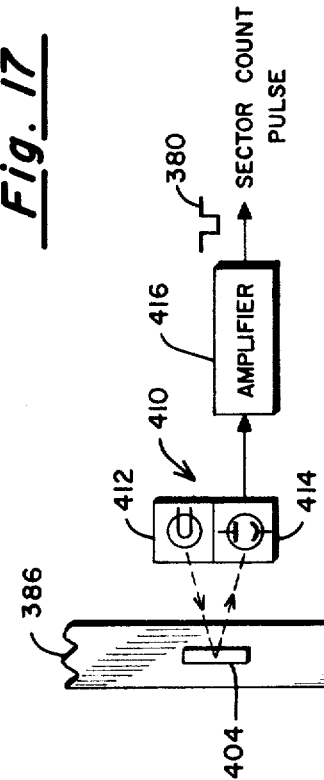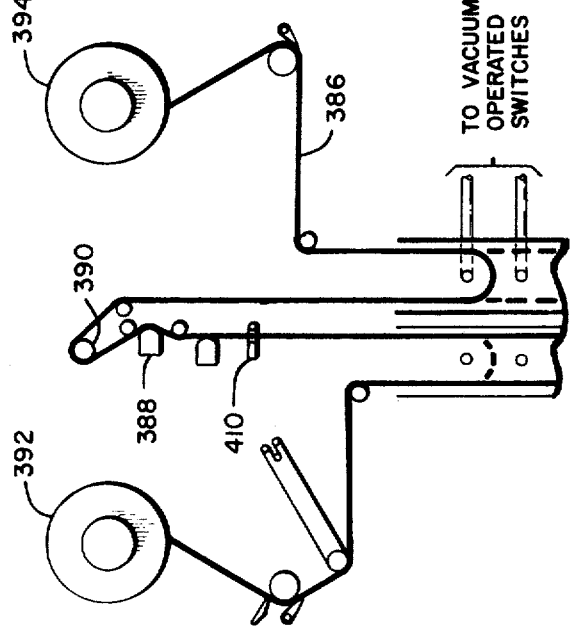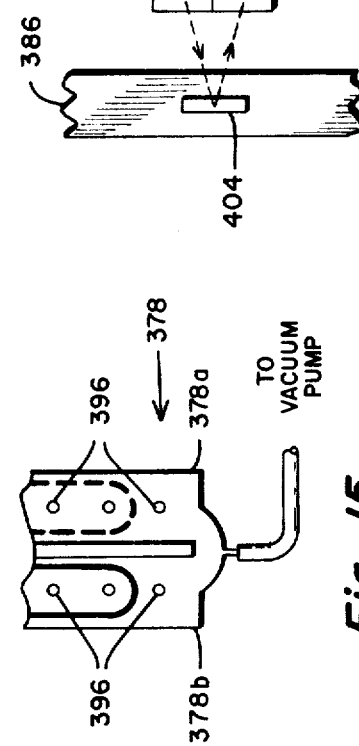

3,343,132
DATA PROCESSING SYSTEM
Merlin L. Hanson and Don M. Meyer, Jr., St. Paul, Minn., assignors to Sperry Rand Corporation, New York, N.Y., a corporation of Delaware
Filed May 16, 1963, Ser. No. 280,878
16 Claims. (Cl. 340—172.5)

This invention relates in general to electronic data processing systems and in particular to an improved interconnection system of a Central Processor and its associated peripheral equipment whereby the relatively low operating speed peripheral equipment may be placed under surveillance of peripheral equipment controls by a Central Processor programmable instruction permitting the peripheral equipment to perform its relatively low operating speed functions without continuous surveillance by the Central Processor.

In present-day data processing systems a Central Processor may be utilized to perform high speed arithmetic operations on digital data which may be supplied to it from a plurality of remotely located stations or units of peripheral equipment. Each of these units of peripheral equipment normally is capable of communicating with the Central Processor to transmit digital data thereto and to receive the manipulated digital data back from the Central Processor after it has performed its operations thereon. Included among the plurality of units of peripheral equipment with which the Central Processor may communicate are those units which operate at comparatively low operating speeds, as well as those operating at comparatively high operating speeds. Included in this low operating speed class are those devices which require mechanical operations, such as Paper Tape Punches/Readers, Typewriters, Magnetic Tape Units, Magnetic Drum Units, High Speed Printers, Card Punches/Readers, etc. Since present day Central Processors are capable of performing operations in a few millionths of a second while most types of peripheral equipment generally function at a much slower rate, i.e., several thousandths of a second, it would be inefficient to delay the Central Processor's computation process merely to require it to maintain surveillance of the external equipment.

At the present time high speed electronic data processing systems are utilized for rapidly processing many forms of data. These systems generally consist of a Central Processor having a plurality of independent input/output units associated therewith which may be separately connected to the Central Processor thereby providing a flexible system. However, these input/output units are asynchronous with respect to the Central Processor, as for example, the Magnetic Tape Unit may process data at the rate of 40 microseconds per 6-bit character while the Central Processor may process data at the rate of 10 microseconds per 30-bit character. Consequently, when an input/output unit such as a Magnetic Tape Unit is selected, the speed at which data is transferred between the Central Processor and the Magnetic Tape Unit must be controlled by the selected Magnetic Tape Unit. Therefore, this process slows down the system and requires the Central Processor to delay its computational process for a relatively long period of time.

A preferred embodiment of the present invention is directed toward a highly efficient system of controlling a plurality of Magnetic Tape Units by a Central Processor whereby each Magnetic Tape Unit once activated by the Central Processor controls its own search function releasing the Central Processor from the task of performing the surveillance of the Magnetic Tape Unit. To better understand the significance of this invention assume an electronic data processing system including a Central Processor and four Magnetic Tape Units. In a present day arrangement of such a system, the Central Processor would transmit to suitable input/output circuitry coded data designating the specific Magnetic Tape Unit from which the desired data is to be read out or on which the designated data is to be written. This coded data termed an Instruction Word is interpreted, or translated, by a magnetic tape control unit which activates the designated Magnetic Tape Unit initiating a search function upon the designated Magnetic Tape Unit tape. The designated tape is processed, i.e., moved forward, backward, etc., under continuous control or surveillance of the Central Processor as the Central Processor interprets the data recorded upon the tape surface. Surveillance of the moving tape by the Central Processor is continued until the tape sector designated by the Instruction Word is detected whereupon the Central Processor-Magnetic Tape Unit interconnection is deactivated with the Magnetic Tape Unit awaiting further instructions from the Central Processor.

With present tape lengths of 2400 feet and tape speeds of 500 feet per minute it can be seen that a Magnetic Tape Unit search function or a general housekeeping operation initiated with the tape positioned at the beginning of tape sector 1 and which required positioning of the tape at a sector near the opposite end of the tape would require over four minutes of continuous Central Processor surveillance. Assuming that the time required by the Central Processor to perform the internal program execution of the Instruction Word designating the Magnetic Tape Unit search function and to communicate this command to the Magnetic Tape Unit might require 20 microseconds it can readily be seen that a very small amount of time is required to initiate the designated Magnetic Tape Unit search function as compared to the very large amount of time that is required to control the Magnetic Tape Unit during the search function once it has been initiated. If it can be assumed that the average time required to perform the internal program execution of an Instruction Word is 20 microseconds, the Central Processor could have executed 12 million instructions during the time it was required to monitor the Magnetic Tape Unit's search function. Obviously then, if the Central Processor need only be utilized to perform the internal program execution of the Instruction Word designating a particular Magnetic Tape Unit search function which is to be performed and to communicate this command to the Magnetic Tape Unit and if each Magnetic Tape Unit were to contain control means to maintain control over itself during the search function the Central Processor control need only be required for a period of 20 microseconds as compared to the four minutes of the previous example.

Accordingly, a primary object of this invention is to provide a system wherein a control unit independent of the Central Processor monitors the peripheral equipment's housekeeping function releasing the Central Processor for high speed data manipulation during the external monitoring of the peripheral equipment.

Another object of this invention is to provide a Magnetic Tape Unit control system wherein a program instruction word from a Central Processor—which program instruction word specifies the Magnetic Tape Unit and tape sector number of which or to which information is to be extracted or added—merely activates a Magnetic Tape Unit control system which system then monitors the functions designated by the Central Processor Instruction Word and which system places the specified tape sector under the read-write head in preparation for the next Central Processor program instruction.

A more general object of this invention is to provide a method and an apparatus for the internal controlling and monitoring of the housekeeping function of a unit of peripheral equipment in an electronic data processing system.

These and other more detailed specific objectives will be disclosed in the course of the following specification, reference being had to the accompanying drawings, in which.

FIGS. 5a, 5b, 5c, and 5d are illustrations of the Magnetic Tape Control Cabinet's word format.

FIG. 6a is a block diagram symbol utilized to represent the NOR circuit utilized in the controls of the present invention.

FIG. 6b is a truth-table for the NOR circuit of FIG. 6a and is accompanied by its definitive logic equations.

FIG. 7a is a logic diagram of the Flip-Flop circuit utilized in the controls of the present invention.

FIG. 7b is a block diagram symbol utilized to represent the Flip-Flop logic circuit of FIG. 7a.

FIG. 8 is a block diagram symbol utilized to represent the AND circuit utilized in the controls of the present invention.

FIG. 9 is a block diagram symbol utilized to represent the OR circuit utilized in the controls of the present invention.

FIG. 10 is a block diagram symbol utilized to represent the Inverter circuit utilized in the controls of the present invention.

FIG. 11a is a logic diagram of the Toggle Flip-Flop circuit utilized in the controls of the present invention.

FIG. 11b is a block diagram symbol utilized to represent the Toggle Flip-Flop logic circuit of FIG. 11a.

Figure 4:
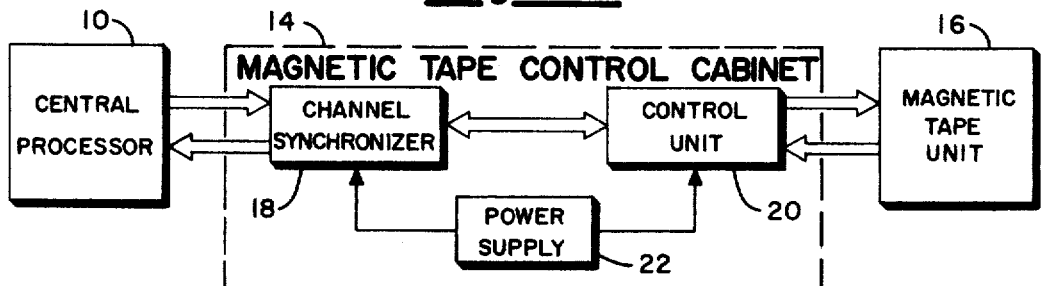
FIG. 4 is a block diagram of the Magnetic Tape Control Cabinet of FIG. 1.

FIG. 12 is a block diagram of the Channel Synchronizer of FIG. 4.

Figure 13:
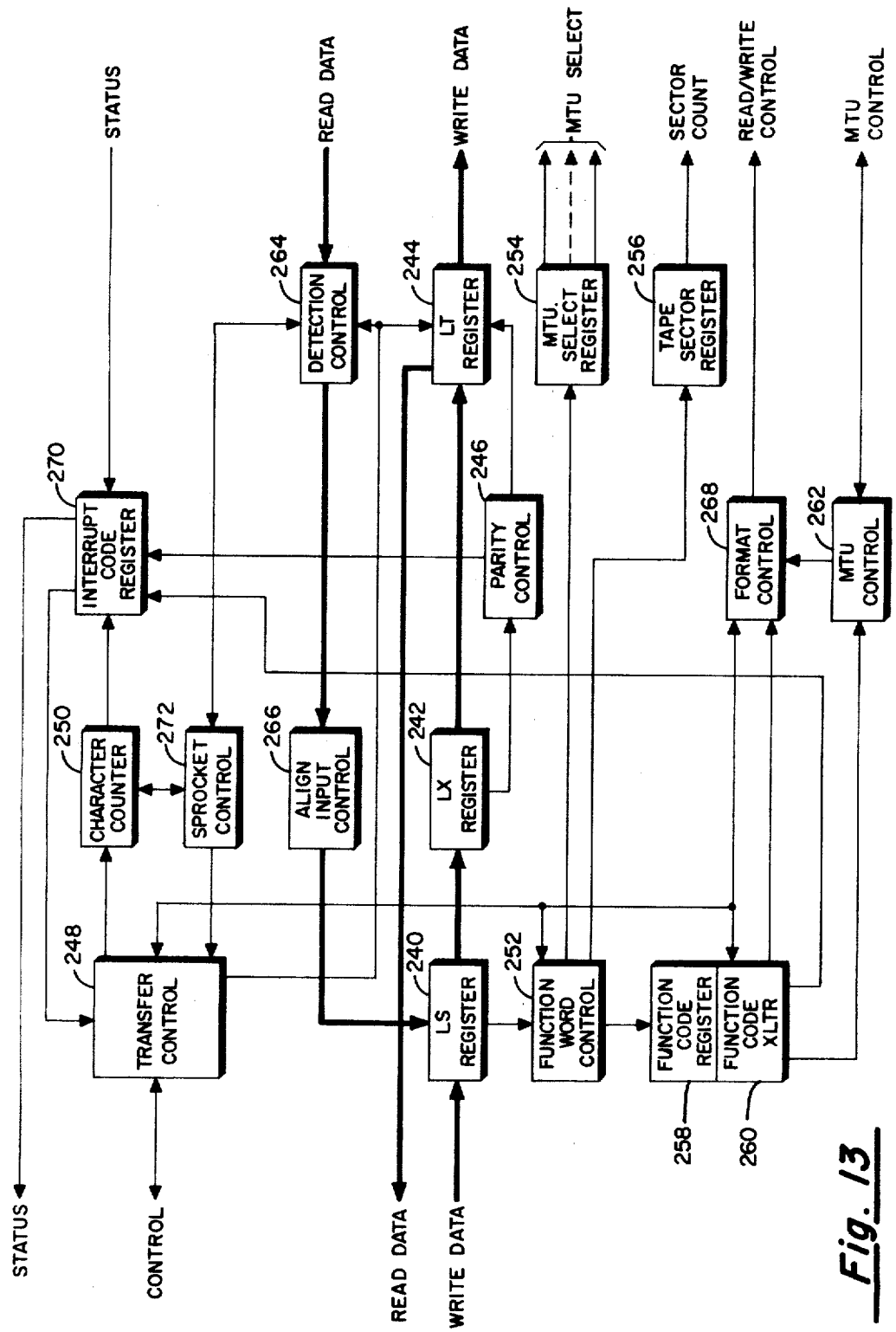

FIG. 13 is a block diagram of the Control Unit of FIG. 4.

FIG. 14 is a block diagram of the Magnetic Tape Unit of FIG. 4.

FIG. 15 is a functional illustration of the Magnetic Tape Unit tape transport system.

FIG. 16 is an illustration of the magnetic tape utilized with the present invention.

FIG. 17 is an illustration of a cross section of the magnetic tape of FIG. 16.

FIG. 18 is a functional illustration of the sector count detector system utilized in the present invention.

Figure 19:
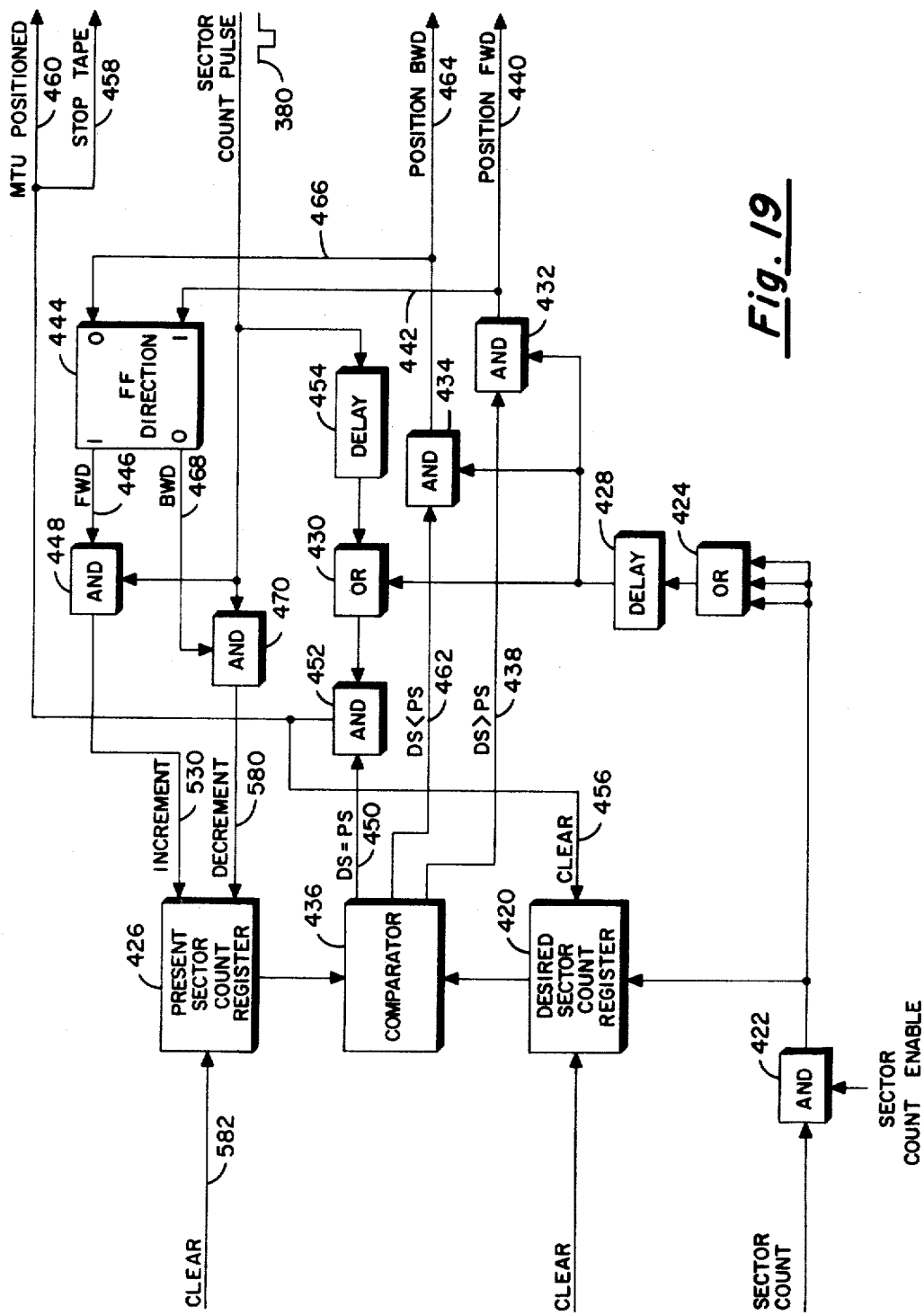

FIG. 19 is a block diagram of the sector count control utilized in the present invention.

Figure 20:
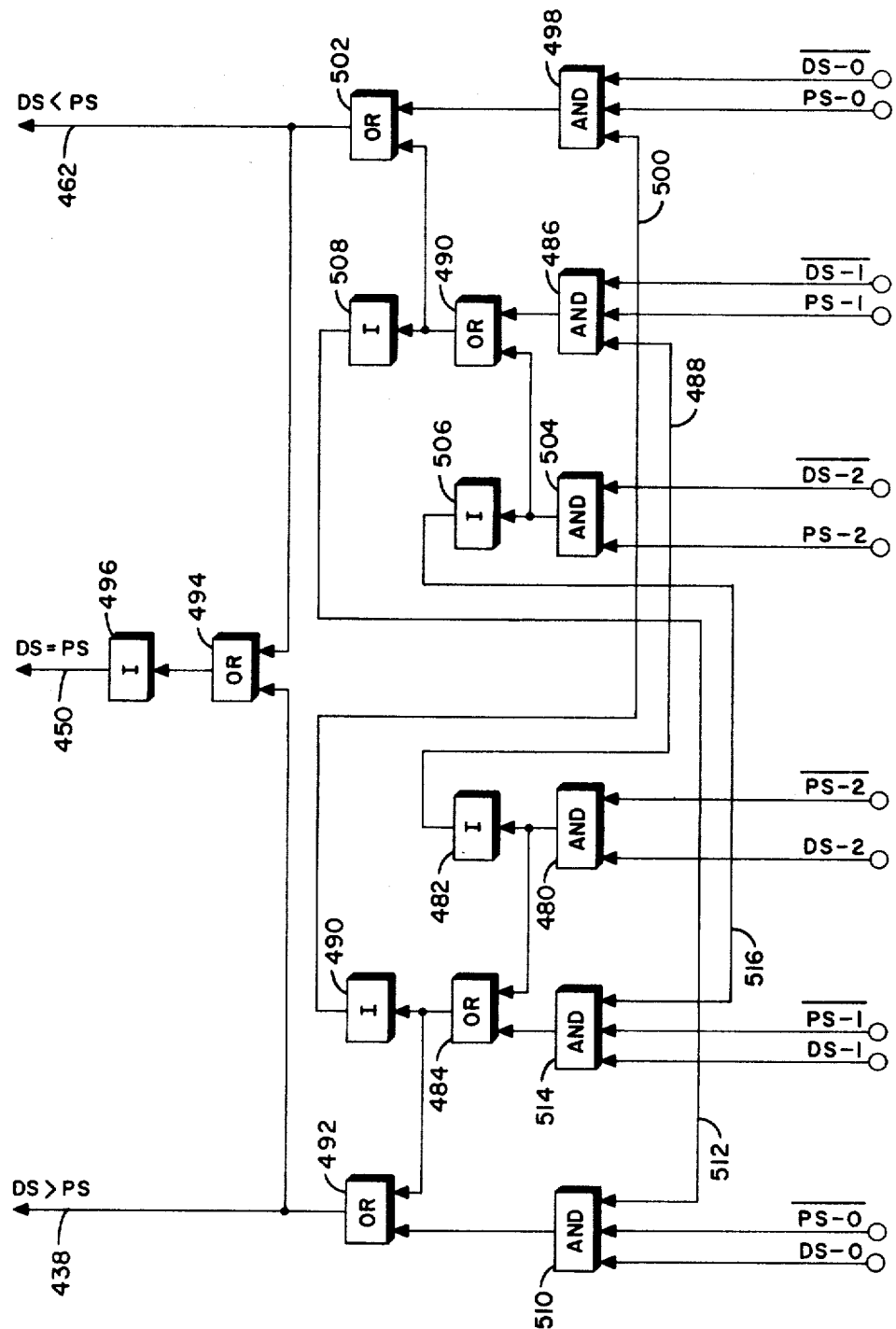

FIG. 20 is a block diagram of the comparator utilized in the present invention.

Figure 21:
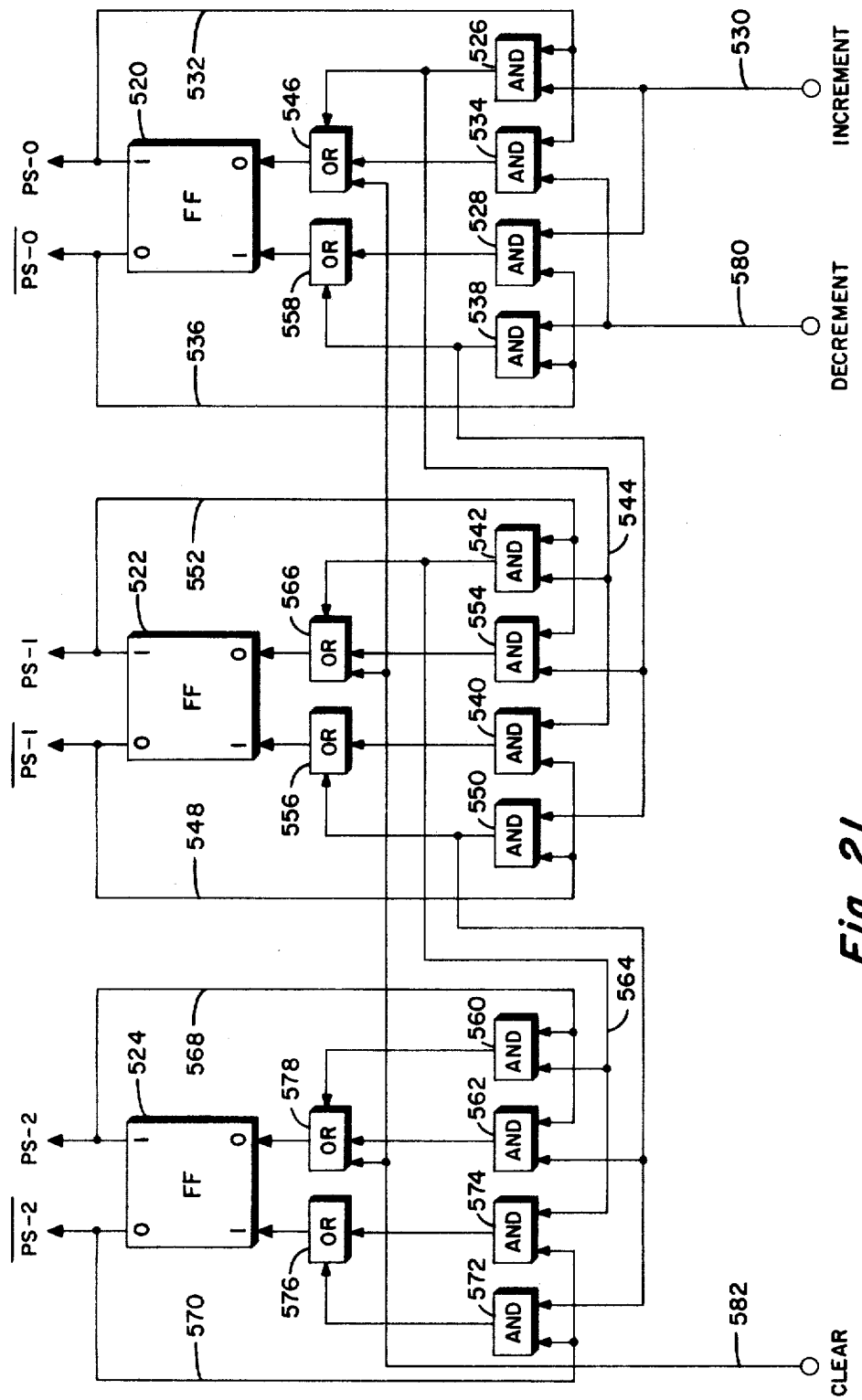

FIG. 21 is a block diagram of the present sector count register utilized in the present invention.

Figure 22:
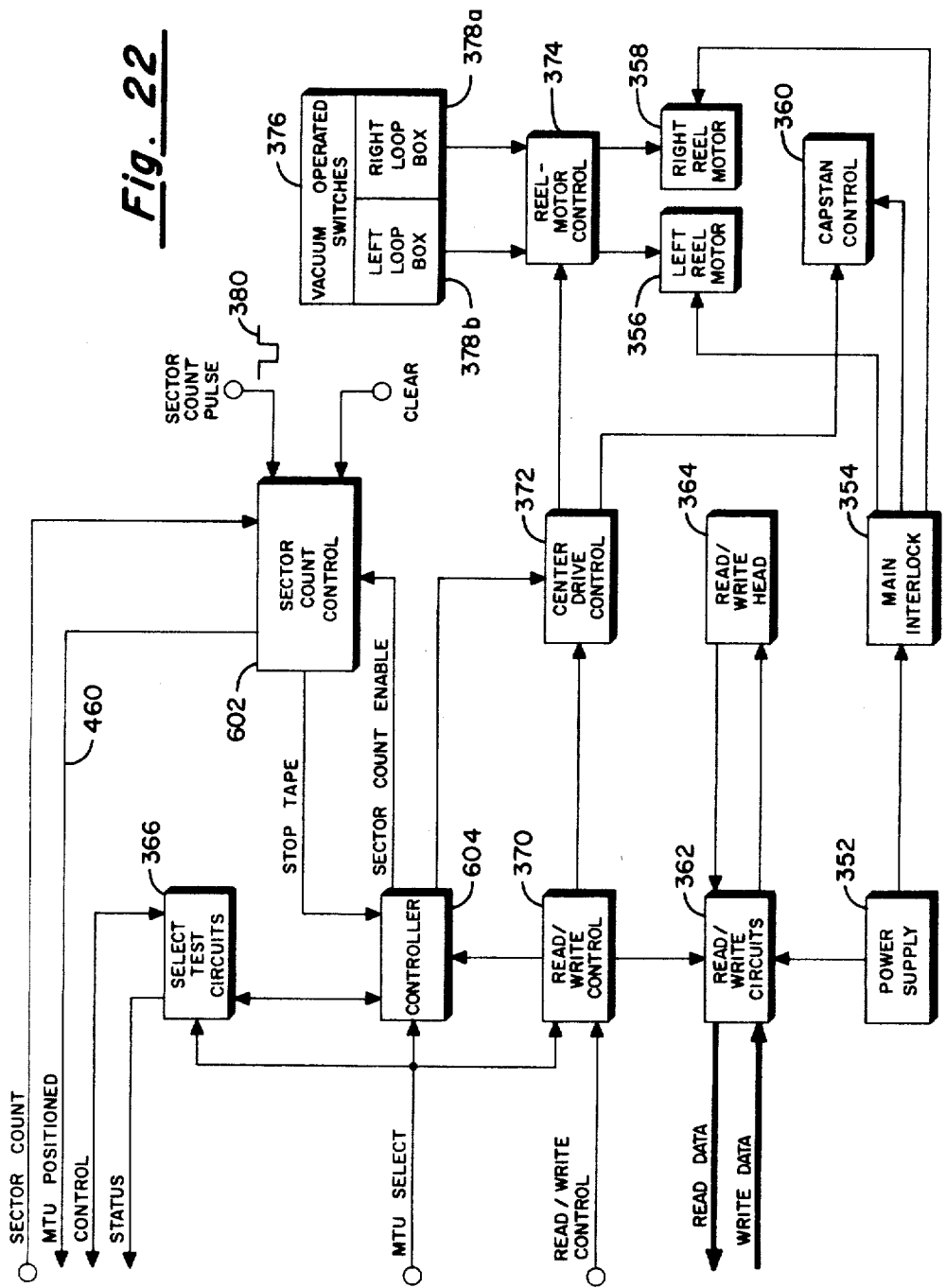

FIG. 22 is a block diagram of another embodiment of the Magnetic Tape Unit of FIG. 4.

Figure 23:
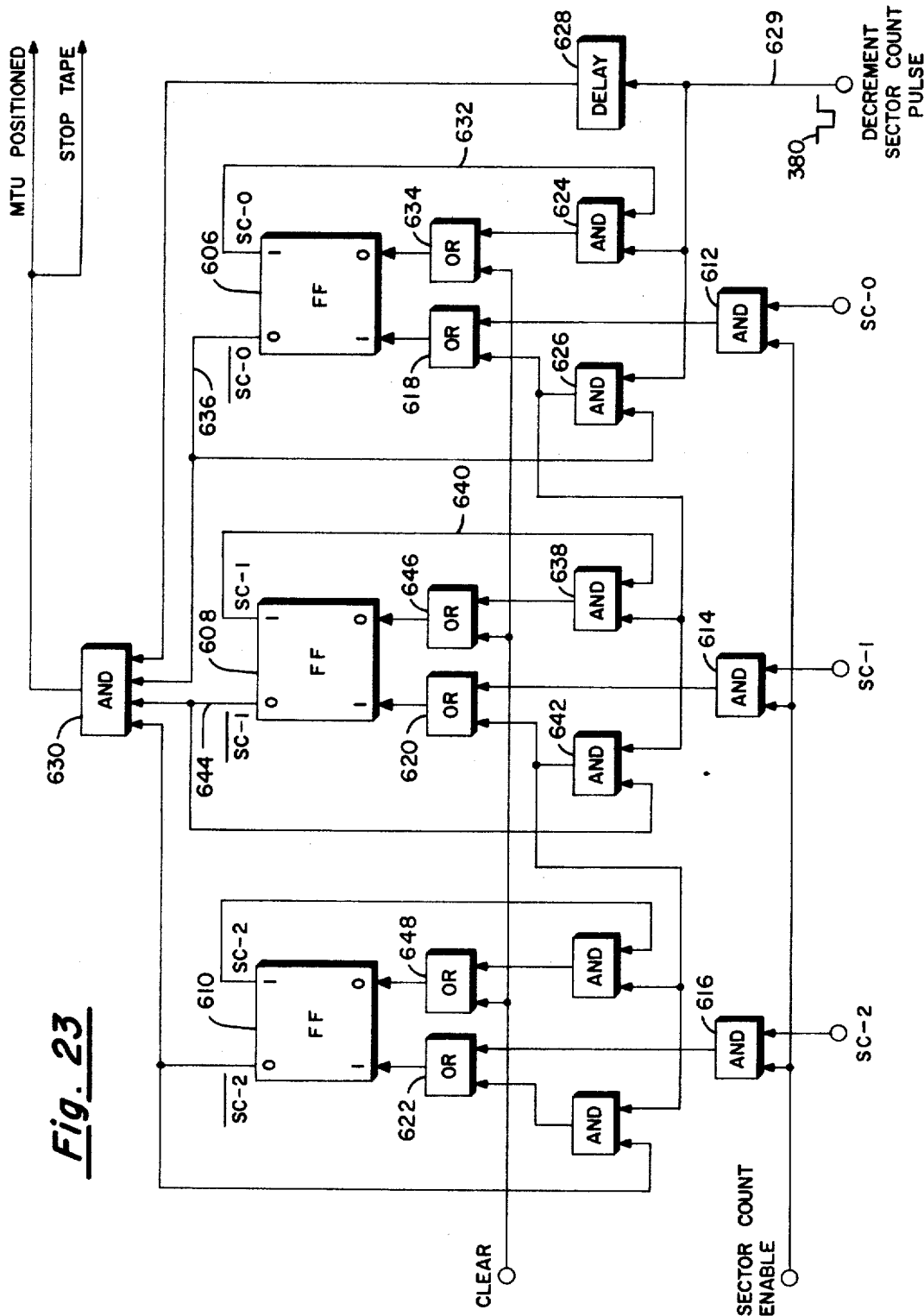

FIG. 23 is a block diagram of the sector count control utilized in the embodiment of FIG. 22.

Figure 1:
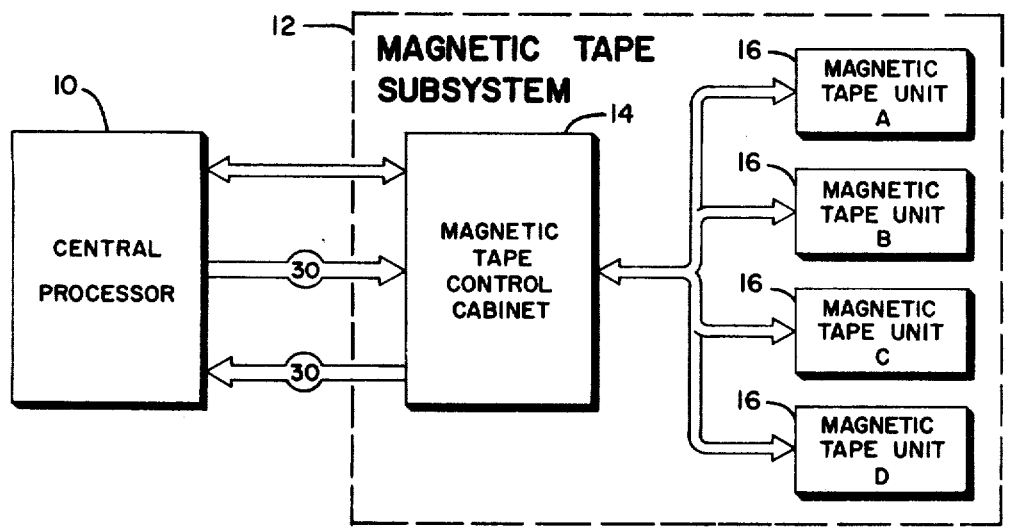
FIG. 1 is a block diagram of an electronic data processing system incorporating the concepts of this invention.

The illustrated embodiment of FIG. 1 includes a Central Processor 10 and a Magnetic Tape Subsystem 12. Central Processor 10 is the means whereby programmable control signals are originated and transmitted to Magnetic Tape Subsystem 12 which subsystem interprets the received control signals to implement data transfer therebetween. In order that the present invention is to be understandable, it is illustrated as being incorporated in the environment of FIG. 1 although as stated herein no limitations thereto are intended. Although Central Processor 10 is discussed superficially below it is to be understood that it is not a necessary element of the present invention, for the necessary control signals and data signals may be provided by any suitable means. However, to realize the optimum benefit of the present invention, i.e., the saving of the operating time of a high operating speed device when controlling a low operating speed device, the illustrated embodiment of FIG. 1 is utilized for the purpose of discussing the preferred embodiment of the present invention. Operation of the electronic data processing system of FIG. 1 is with respect to the Central Processor 10; an output operation is information transfer from the Central Processor 10 to the Magnetic Tape Subsystem 12, while an input operation is information transfer from the Magnetic Tape Subsystem 12 to the Central Processor 10.

FIG. 1 is a block diagram of an electronic data processing system in which the concept of this invention may be incorporated. This system includes Central Processor 10, Magnetic Tape Control Cabinet 14 and four similar Magnetic Tape Units A, B, C and D all designated by similar reference number 16. Although the illustrated embodiment of FIG. 1 is directed toward an environment of a Central Processor controlling a plurality of Magnetic Tape Units the concept of this invention is not to be limited thereto. As stated previously, a primary object of this invention is to permit a more efficient utilization of a relatively high speed operating device which utilizes one or more relatively slow speed operating devices as units of the peripheral equipment for input/output functions. It is apparent then that other previously mentioned slow speed items such as Paper Tape Punch/Readers or Card Punch/Readers may be utilized as the units of peripheral equipment to be monitored by the control means of the present invention. The basic environment for the most efficient utilization of the concept of this invention is that of a high operating speed programmable device such as a stored memory random access computer, plugboard program data analyzer, or the like, which through the use of coded instructions direct the control of low operating speed peripheral equipment which equipment once activated by the high operating speed device require continuous monitoring, or surveillance, during the execution of the coded instruction. Although the Central Processor 10 utilized in the illustrated embodiment is a high speed random access stored program computer it is to be understood that any programmable device may be utilized.

Magnetic Tape Control Cabinet 14 provides Central Processor 10 with access to and control of a plurality of Magnetic Tape Units 16. Magnetic Tape Control Cabinet 14 includes modular items; (see FIG. 4) Channel Synchronizer 18, Control Unit 20 and a Power Supply 22. The Channel Synchronizer 18 and the Control Unit 20 convert the 30-bit Central Processor digital data words into a form acceptable to the Magnetic Tape Subsystem 12, and interprets the instructions issued by the computer instruction words. Magnetic Tape Control Cabinet 14 also provides the capability of notifying the Central Processor 10 of certain specified occurrences which affect system operation.

Each Magnetic Tape Unit 16 includes a magnetic tape transport system which shall be discussed later in further detail.

CENTRAL PROCESSOR

The illustrated embodiment of the present invention utilizes a large-scale general-purpose high-speed digital computer which will be termed a "Central Processor." This Central Processor emphasizes rapid communication with external devices and implies a large random access internal memory.

The Central Processor is of the stored program type. That is, once the program of instructions is written and coded in a form acceptable to the Central Processor, it is entered into the memory, or storage, section of the Central Processor via one of the pieces of external, or peripheral, equipment. From this point on, the Central Processor, upon proper initiation, will execute the series of instructions which make up the program, and thereby perform its intended function. Single-address instructions are employed and have an average execution time of 20 microseconds. These instruction words are the same number of bits (binary digits) as are utilized in the memory registers of the Central Processor. Each memory section register is selectively addressable either as a single 30-bit word, or as two independent 15-bit words. The Central Processor utilizes the parallel binary mode in the performance of arithmetic and logical operations. A one's complement subtractive arithmetic system of modulus $2^{30}-1$ is used.

Communication between the Central Processor and its associated external equipment is normally handled by a block transfer of data, with timing under control of the external device. Such transfers of data have independent access to storage to thereby allow asynchronous operation with the main Central Processor program. A communication path is established by a sequence of request and response signals between the selected external equipment and the Central Processor. Such signals may originate in either the Central Processor or the external device. The main Central Processor program is interrupted by external request signals and a communication channel, or link, is established. Once the link has been created the Central Processor returns to the main program sequence and the block transfer of input or output data proceeds without program reference until completed. The Central Processor employs 14 input and 14 output channels each comprised of 30 parallel lines. Two input and two output channels are reserved for communication with other Central Processors. Output channels can carry external function words as well as data words, and can thereby specify the function desired of the selected external equipment.

Figure 2:
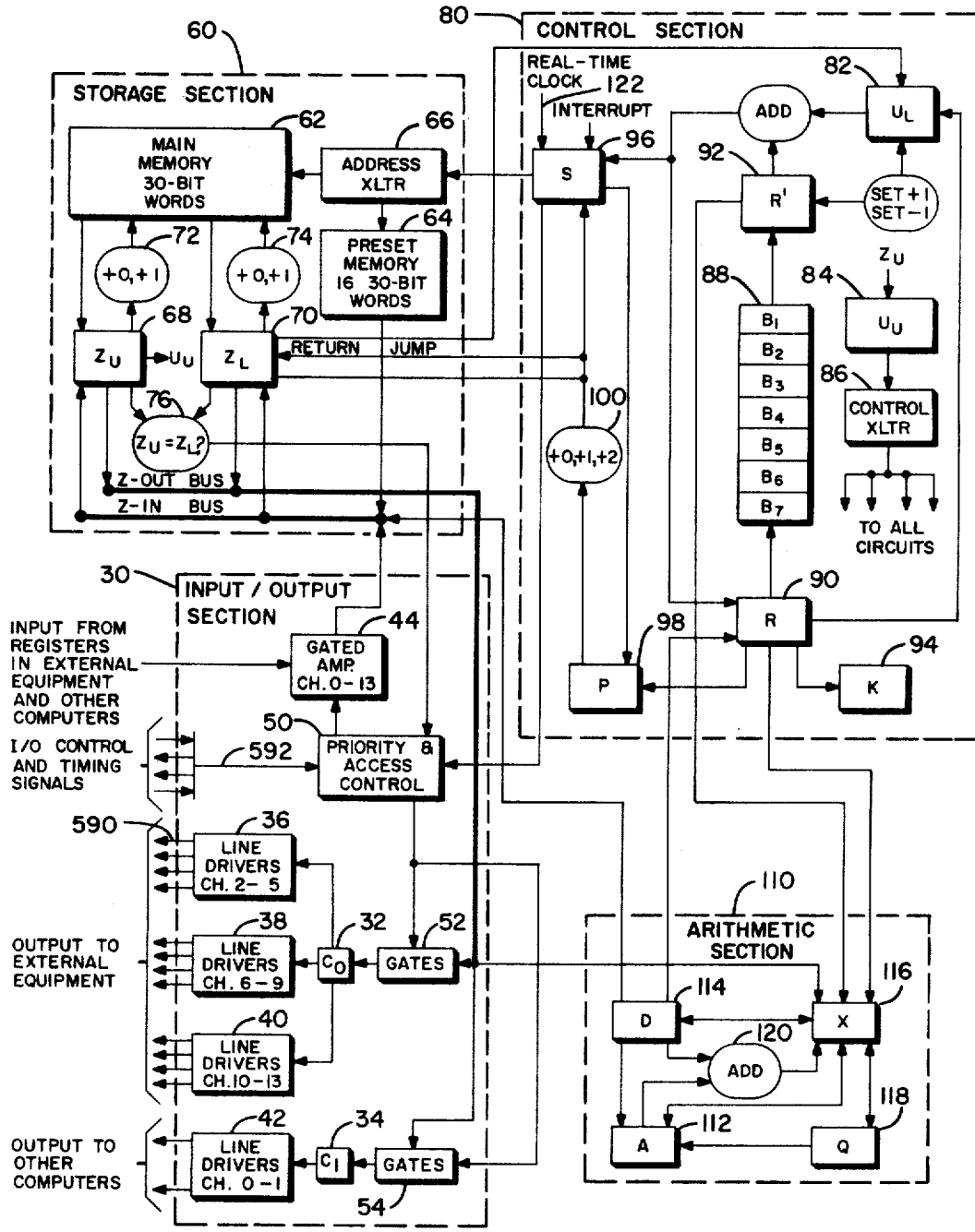
FIG. 2 is a simplified functional block diagram of a Central Processor showing a relationship of its major sections.

A simplified block diagram of a Central Processor appears in FIG. 2, and for explanatory purposes may be described in four major sections: Input/Output, Storage, Control, and Arithmetic. Abbreviations on the diagram are explained as the various sections are discussed.

*Input/Output*

The Input/Output sections which include those data paths and control circuits used by the Central Processor to communicate with external equipment, is shown enclosed in block 30 of FIG. 2. The detailed operation of the Input/Output section of the Central Processor is described in copending application entitled Computer Input-Output System, Ser. No. 156,375, filed Dec. 1, 1961, and is assigned to the assignee of the present invention. The main parts of the Input/Output section are: (1) Two output registers consisting of the C0-register 32, and the C1-register 34 with their associated line drivers 36–40, and 42, respectively; (2) 14 sets of gated input amplifiers 44, and, (3) priority and access control circuits 50.

The C0-register 32 is used for data transmission to all external devices except other Central Processors. As illustrated in FIG. 2, the C0-register 32 receives inputs directly from Storage section 60 via gates 52 which are controlled by the priority and access circuits 50. Three sets of line drivers 36, 38 and 40 branch from the output C0-register 32; each set being utilized to drive four output channels with gated registers located in the external device.

The C1-register 34 handles the transmission of data between Central Processors over two special output channels. Operation of this register is similar to that the C0-register 32 in that data words enter the C1-register from Storage section 60 via gates 54 which are controlled by the priority and access circuits 50 and are transmitted over the active channel by a set of 30 line drivers.

The output channels of this embodiment are numbered from 0 to 13, and if two or more transmissions are simultaneously requested, the channel with the highest number is granted priority with the others following in order. A set of 30 gated amplifiers 44 is provided for each of the 14 input channels. These gates are controlled by the priority and access circuits 50, with the channel having the highest number being given priority for the instance when two or more channels are simultaneously requested. As in the case of output channels, channels 0 and 1 are used for inter-computer communication, and therefore receive the lowest priority. It should be noted that this method of treating input data eliminates the need for input buffer registers and gives the external equipment direct access to the computer's internal memory.

Some functions of the priority and access circuits 50, such as gating input and output transmissions and assigning priorities to the channels, have previously been described. Additionally, these circuits operate to accept and transmit the control and timing signals which must be exchanged between the Central Processor and the external equipment with which it communicates. A further function includes a means of testing the various channels to determine whether they are currently being utilized to thereby prevent the Central Processor from attempting to communicate over a channel already in use.

The main memory addresses referenced during the particular input or output transfer are determined by a special I/O control word. One such word is assigned to each channel. It is sufficient for this summary to note that a signal generated by the I/O control word is used by the priority and access circuits 50 to deactivate the channel after the proper number of words has been transferred.

*Storage*

The Storage section of the Central Processor is enclosed in dashed line 60 in FIG. 2, and consists of the main memory 62, wired auxiliary memory 64, and the associated address translator circuits 66, and control circuits. The main memory 62 is constructed of a modular array of ferrite cores for this embodiment. It is coincident-current-driven, and is addressed via the address translator 66. The contents of the referenced address is read into the 30-bit Z-register which is comprised of two 15-bit sections termed Z upper ($Z_U$) 68, and Z lower ($Z_L$) 70 to provide for the optional use of 15-bit half words as described above. The main memory operates in the destructive read-out mode, with a time required for the read-restore cycle of approximately 8 microseconds. During the restore portion of the cycle, the contents of the 15-bit $Z_U$-register 68, or the 15-bit $Z_L$-register 70 may be increased by one as indicated by the $+0$, $+1$ modifier boxes 72, 74. This facility is utilized in conjunction with the Input/Output section 30 for automatically increasing the I/O control words, with the result that addresses referenced during a block transfer of data are automatically advanced. In conjunction with these modifier boxes 72, 74, the comparator, $Z_U=Z_L$?—labeled 76, is used to detect coincidence between the two halves of the I/O control word. When such coincidence occurs, a signal is generated to terminate the I/O transfer.

*Control*

The Control section of the Central Processor illustrated in FIG. 2 is enclosed by dashed line 80 and consists of those registers and circuits necessary to procure, modify, and execute instructions of the stored program. Each Instruction Word to be executed is transmitted to the program-control register, designated the U-register, which is divided into two 15-bit registers, the $U_L$-register 82 and the $U_U$-register 84. The operation code and the various execution modifiers are translated by the control translator 86 from the appropriate section of this register. The $U_L$-register 82 has addition properties, modulus $2^{15}-1$, and is utilized when address modification is required before execution of the instruction by the contents of one of the appropriate B-registers 88.

The 15-bit R-register 90 and the 15-bit R'-register 92 operate as communication registers for the B-registers 88 such that all internal transmission to or from the B-registers pass through them. The 6-bit K-register 94 operates as a shift counter for all arithmetic operations that involve shifts. The 15-bit S-register 96 holds the storage address during a memory reference and is utilized in conjunction with the Storage section 60 to gain access to the main memory 62. Instruction Words are obtained from the Storage section of the Central Processor under control of the storage address register 96 and are loaded into the instruction register where they are retained during the execution of the instruction. As was stated above, the Central Processor is concerned with and operates as a stored program device, hence, once the program is written and stored in the Central Processor in the appropriate form in the Storage section 60, it is free to operate automatically. Upon proper initiation, the Central Processor will execute the series of instructions making up the program. Normally, the instruction of the program are stored in the main memory 62 of the Central Processor in a sequential manner, such that the computer will first execute the instruction whose address has initially been set in the program address counter, or P-register 98. It then proceeds in an instruction-by-instruction manner to the highest address. The modifier box 100 is included to indicate that as each instruction is executed, the address of the current instruction is incremented by $+0$ in a case of a repeat, by $+1$ in cases where the execution of instructions has to take place in sequential order, and by $+2$ in a case where a SKIP condition is satisfied.

Arithmetic

The Arithmetic section of the Central Processor is shown enclosed by dashed line 110 and is that part of the Central Processor which performs the numeric and logical calculation. Though greatly simplified, FIG. 2 shows the important components of the Arithmetic sections which are the A-register 112, the D-register 114, the X-register 116, the Q-register 118, and the ADD circuitry 120. The 30-bit A-register 112 may, for programming purposes, be thought of as a conventional accumulator register, but because of the logic employed, the A-register 112 is actually only the primary rank of the accumulator. In addition to the A-register 112, the accumulator utilizes the D-register 114 as a second rank. This yields a configuration which is different from former and so-called "usual" arrangements, but permits the use of a more reliable logical building-block circuit. To illustrate the interrelationship of these registers consider the ADD operation, wherein the augend is placed in the A-register 112, and the addend is placed initially in the D-register 114. As the addition is performed by the ADD tree 120 the sum is formed in parallel and placed in the X-register 116, and at completion is transmitted back to the A-register 112. The utilization of the 30-bit Q-register 118 is primarily during the Multiply and Divide operations to yield a double-length register in conjunction with the A-register 112. The Q-register 118 is also used extensively in the many logical instructions available in the Central Processor.

Real-time clock

In addition to the four main sections of the computer just described, the Central Processor has a real-time clock 122, and is utilized to maintain an accurate record of time. This clock may be used to log the receipt times of a periodic real-time input. Each message and its receipt time may be recorded together. Another use of the clock is to initiate periodic programmed operations without requiring more than occasional attention of the main program. Since the clock recycles only once in approximately a week, it is suitable for use where the computer is used on an around-the-clock basis. This provides a function which is readily adaptable to the use in process control and many other real-time operational functions.

Instruction Word format

Figure 3A:
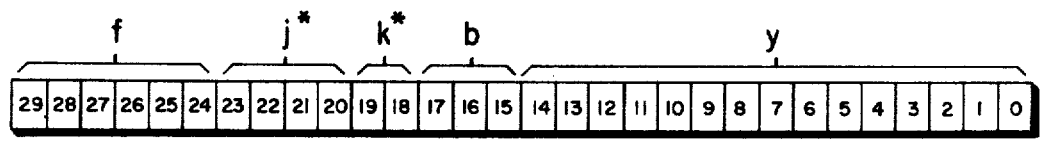
FIGS. 3a and 3b are illustrations of the Central Processor's Instruction Word format.
Figure 3B:
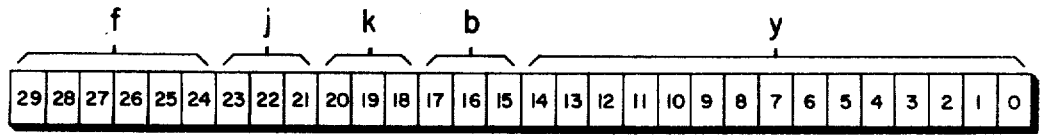

In FIG. 3a is shown a format of the Instruction Word employed in association with the Input/Output section of the Central Processor. In FIG. 3b is shown the format of the Instruction Word used with all other instructions for the Central Processor. The term "instruction" as used herein signifies a predetermined timed sequence of events to be performed within the computer. Each instruction is represented initially by what is commonly termed an "Instruction Word," which is represented by a predetermined set of electrical signals included to represent either variable or invariable instructions, and appears as a configuration in the binary number system. An Instruction Word is 30-bits in length, and is made to be able to be stored in one memory section register. An Instruction Word is the primary indication to the Central Processor of a sequence of events which it is to perform. When the Instruction Word is translated by the control translator 86 the electronic and electrical hardware in the Central Processor causes a succession of signals termed "commands" or "commend enables" to be developed to cause the execution of sequences which will result in the performance of the functions designated by the instruction. The terms "program" or "routine" refer to a predetermined set of instructions arranged in a particular manner to effect the solution of a desired problem or to execute a given action.

As can be seen from FIG. 3b, the Instruction Word is comprised of five sections defined by "designators," which are the $f$, $j$, $k$, $b$ and $y$ designators. It will be noted that the same designators appear in FIG. 3a with the variation being that the $j$ designator shown in FIG. 3b appears as the $j^*$ designator in 3a, and the $k$ designator in FIG. 3b appears as the $k^*$ designator in FIG. 3a. The reason for this variation will be discussed later. The $f$ designator is normally 6-bits in length and indicates the particular instruction to be executed, such as ADD, SUBTRACT, etc., and is commonly termed the "operation" code, which is abbreviated to "OP" code. The $j$, $k$, $b$ and $y$ designators allow modifications of the basic Central Processor sequence specified by the $f$ designator. For all instructions except the Input/Output instructions, the length of the $j$ designator is 3 bits, and is used in the majority of instructions for jump and skip determination, for instruction operand modification selection, and for repeat status interpretation. When the Central Processor is executing an Input/Output type instruction, the configuration illustrated in FIG. 3a prevails and the $j$ designator is denoted by $j^*$ and is increased in size to 4 bits to thereby allow the designation of the 0–13 Input/Output channels. The $k$ (or $K^*$ in the case of I/O instructions) designator controls the interpretation of the operand. The $b$ designator appears in bit position 17, 16, and 15 of the Instruction Word, and specifies which one of the B-registers 88, which are labeled B1 through B7, will be used to modify the operand designator $y$. The operand designator termed the $y$ designator is utilized either to indicate the address in the memory section 62 where the operand is stored, or may itself be a 15-bit operand, as designated by the particular $k$ designator.

Associating FIGS. 3a and 3b to FIG. 2, it can be seen that the upper half of the Instruction Word will be stored in the $U_U$-register 84, and will thereby contain the $f$, $j$, or $j^*$, $k$ or $k^*$, and $b$ designators. The lower half of the Instruction Word will be stored in the $U_L$-register 82, which will thereby contain the operand designator $y$. The control translator 86 is connected to the output of the $U_U$-register 84, and is utilized to interpret the OP code to determine the computational operation designated by the $f$ designator, with the various execution modifiers to produce the proper command enable signals to execute the total instruction as specified. If address modification is required prior to the execution of the instruction, the contents of a predetermined one of the B-registers 88, as specified by the $b$ designator, is added to the contents of the lower order 15-bits of the Instruction Word, which is stored in the $U_L$-register 82, before execution. Not shown in the block diagram of FIG. 2 in the control section 80 are the circuits required for the timing and execution of the instructions.

Instruction sequences

The executions of the instruction in the Central Processor are carried on in response to clocked major "sequences." The timing is such that the utilization of these sequences may in effect cause instructions to slightly overlap thereby optimizing the speed of calculation of the Central Processor. The major sequences are termed A, B, C, and D, each of which performs a logical portion of an instruction. The A sequence controls the timing necessary to obtain an instruction from the memory which is to be executed, and places it in the 30-bit U-register (see FIG. 2). Following the completion of this sequence, the B sequence timing will select the operand, as controlled by the $k$ designator, and place it in the D-register 114 (assuming an operand is required). The arithmetic computations are initiated under the control of the C sequence. In the event that the instruction to be executed is of the "store" class, the D sequence will be initiated thereby controlling the storage of the resulting operand in the main memory.

The major sequences, A, B, C, and D are performed successively to execute an instruction. While the execution of every instruction is accomplished by means of A, B, and C, many instructions do not utilize the D sequence. As was mentioned above, only those instructions which store an operand use the D sequence.

In addition to the major sequences, there are minor sequences which generally perform specific and more simple operations. All subsequences are initiated by a major sequence. For example, during the B sequence the operand referenced for arithmetic operation is read into the D-register. This transmission of data is accomplished by initiation of the "read as modified by $k$" subsequence.

In general it can be said that the major sequences accomplish the following:

(1) *A sequence.*—Read the next instruction as designated by the P-register from memory, and modify $U_L$ as directed by the index modifier $b$ ($xx\ xxb\ xxxxx$).

(2) *B sequence.*—Read a specified operand as controlled by the $k$ designator to the D-register ($xx\ xkx\ xxxxx$).

(3) *C sequence.*—Accomplish the arithmetic computation and sense the $j$ designator conditions ($xx\ jxx\ xxxxx$).

(4) *D sequence.*—Store operand (if applicable) as controlled by the $k$ designator, providing the OP code portion designates a store instruction.

With respect to the overlapping capability available in the execution of instruction, it can readily be seen that once an instruction has proceeded to the point that the operand is being stored by the D sequence that the next instruction can be partially selected via the A sequence. It should be noted further that optimum usage of time exists in that the D sequence does not occur in the event that an operand is not referenced to be stored by the particular instructions.

MAGNETIC TAPE SUBSYSTEM

The Magnetic Tape Subsystem 12 of FIG. 1 includes a Magnetic Tape Control Cabinet 14 and from two to twelve Magnetic Tape Units 16 and is an input/output device capable of reading or writing data on magnetic tape. For purposes of simplifying the control circuitry and presenting a more readily understandable presentation of the concept of this invention, only four Magnetic Tape Units 16 are to be utilized in the illustrated embodiment.

MAGNETIC TAPE CONTROL CABINET

The Magnetic Tape Control Cabinet 14 receives control signals from the Central Processor 10, decodes these signals into commands that select and condition a Magnetic Tape Unit 16 to write data on or read data from the magnetic tape. The Magnetic Tape Control Cabinet also performs various checks and, should an error occur, notifies the Central Processor of the occurrence and nature of the error.

WORD FORMAT

There are four types of words used with the Magnetic Tape Control Cabinet; Function Word, Identifier Word, Status Word and Data Word. Each word is comprised of 30 bits with a brief description and use of each word as follows:

A. *Function Word.*—The Function Word (see FIG. 5a) contains the function code defining the operation to be performed, the MTU select bits defining the Magnetic Tape Unit to perform the given operation and the sector select bits defining the tape sector in which the designated operation is to be performed. The function code is located in the upper six bits of the function word; that is bits $2^{29}$ through $2^{24}$. The MTU select bits are located in the lower 12 bits of the Function Word that is bits $2^{11}$ through $2^0$ with the sector select bits located in the next upper 12 bits; that is bits $2^{23}$ through $2^{12}$. The Function Word always precedes any operation.

B. *Identifier Word.*—The Identifier Word (see FIG. 5b) is a normal Central Procescsor word and may be in any bit configuration. It is transmitted to the Magnetic Tape Control Cabinet following a Function Word specifying a search operation. The Channel Synchronizer of the Magnetic Tape Control Cabinet compares the first word of each block (last word if reading backward) to the Identifier Word, and when a compare-equal occurs, the block in which the find occurred is sent to the Central Processor.

C. *Status Word.*—Should an error occur in the Magnetic Tape Subsystem, a Status Word (see FIG. 5c) is sent to the Central Processor notifying it of the error. The Status Code is contained in the upper four bits of the Status Word sent to the Central Processor; that is bits $2^{29}$ through $2^{26}$. The remaining bits may be in any bit configuration. A notification of completion of an operation is also sent via the Status Word, should the Central Processor request such notification.

D. *Data Word.*—During an input or output operation, data is sent in the form of Data Words (see FIG. 5d). These Data Words may be in any bit configuration consisting of five six-bit characters.

INTERFACE

A. *Central Processor.*—Channel Synchronizer: The Control lines and data lines between the Central Processor 10 and the Channel Synchronizer 18 enable the Central Process 10 to communicate with the Magnetic Tape Subsystem 12. FIG. 1 schematically shows the control lines and data lines and their signals as follows:

(1) 30 output data lines: There are 30 output data lines between the Central Processor and the Channel Synchronizer which lines transmit the Function Word and the Data Word to the Magnetic Tape Subsystem during an output operation.

(2) 30 input data lines: There are 30 input data lines betwee nthe Central Processor and the Channel Synchronizer which lines transmit Data Words to the Central Processor during input operations and status codes to the Central Processor in general.

(3) Output data request (ODR): This signal is sent to the Central Processor signifying that the Magnetic Tape Subsystem is ready to receive data from the Central Processor.

(4) External function 1 (EFI): This signal is sent by the Channel Synchronizer indicating that a Function Word is on the output data lines specifying an operation to be performed.

(5) Output acknowledge (OA): This signal is sent by the Central Processor to the Channel Synchronizer indicating to the Magnetic Tape Subsystem that data is present on the data lines.

(6) Input data request (IDR): This signal is sent to the Central Processor indicating that data is present on the Input Data Lines.

(7) Input acknowledge (IA): This signal is sent by the Central Processor to the Channel Synchronizer indicating that the Central Processor has received the Data Word on the input data lines.

(8) External interrupt (EI): This signal is sent to the Central Processor indicating that the operation has been completed or that a status code is available on the input data lines.

B. *Channel Synchronizer.*—Control Unit: The Channel Synchronizer 18 after receiving a word from the Central Processor 10 disassemblies said word into six bit characters and transfers these characters to the Control Unit 20. The Channel Synchronizer also assembles the words during an input/output operation and transfers them to the Central Processor. These control and data lines and their signals are diagrammatically illustrated in FIG. 1 with an explanation of each as follows:

(1) Six bi-directional data lines: These six lines are capable of transmitting data in either direction. They are used in both input and output operations.

(2) Interrupt code lines: The Interrupt Code Lines transmit the status or error conditions that arise in the Control Unit to the Channel Synchronizer.

(3) Stop: Upon receipt of a terminate instruction in the Channel Synchronizer, this signal is sent to the Control Unit. The Control Unit will return a STOP ACKOWLEDGE only when in a master cleared condition. The STOP ACKNOWLEDGE signal will clear the SEARCH controls if a read-search is in process. The Magnetic Tape Unit will stop at the next interblock space, MASTER CLEAR, and then send the STOP ACKNOWLEDGE to the Channel Synchronizer.

(4) Stop Search: This signal is sent to the Control Unit indicating that the Identifier Word has been found. The Control Unit continues transferring information until the end of block is reached.

(5) Résumé: This signal is sent to the Control Unit indicating that output data is on the bi-directional data lines. The signal is also sent to the Control Unit when the Channel Synchronizer has received data during an input operation.

(6) External function 2 (EF2): This signal is sent to the Control Unit indicating that the character on the bi-directional data lines is a Function Word specifying an operation to be performed.

7. Ready: This signal is sent to the Channel Synchronizer indicating that the Control Unit is ready to perform any operation specified by the Central Processor. During output data transfers, the signal is sent to the Channel Synchronizer indicating that the Control Unit has received the last data character and is ready to receive the next. During input data transfer, the signal indicates to the Channel Synchronizer that data is present on the bi-directional data lines.

(8) Status: This signal is sent to the Channel Synchronizer indicating that a Status or Error condition is present on the four interrupt code lines.

(9) Channel Clear: This signal is generated by Channel Clear push buttons located on the Channel Synchronizer maintenance panel and Control Unit maintenance panel. It clears the Control Unit and the Channel Synchronizer.

C. *Control Unit.*—Magnetic Tape Unit: The function to be performed, the Magnetic Tape Unit to perform the function and the tape sector on which this function is to be performed are contained in the Function Word sent to the Control Unit by the Central Processor via the Channel Synchronizer. The specified Magnetic Tape Unit is conditioned to perform the operation via the control lines between the Control Unit and the Magnetic Tape Unit. These control lines and data lines and their signals are diagrammatically illustrated in FIG. 1 with an explanation of each as follows:

(1) Eight write lines: These eight lines transmit the eight bit character (6 data, 1 parity, and 1 sprocket) to the Magnetic Tape Unit to be written on magnetic tape.

(2) Eight read lines: The eight read lines transmit the data read by the Magnetic Tape Unit to the Control Unit during input operations.

(3) Magnetic tape unit select lines: These twelve lines are used in the selection of one of the twelve available Magnetic Tape Units.

(4) Three interlock release lines: Before the initial conditioning of the selected Magnetic Tape Unit may be accomplished by the pick-up signals of 6 below the proper interlock release signal must be present. If the tape is to move in the forward direction, the FIR signal must be present, etc.

(a) FIR—Forward-Interlock Release—indicates that Magnetic Tape Unit being selected is available and set for tape forward position.

(b) BIR—Backward-Interlock Releases—indicates the Magnetic Tape Unit being selected is available and set for tape backward operation.

(c) RIR—Rewind-Interlock Release—indicates that the magnetic Tape Unit being selected is being, or has been, rewound with interlock.

Joint occurrence of the FIR and BIR signals indicates that the Magnetic Tape Unit being selected is in the initial or first sector condition and is ready to accept pick-up signals for tape forward operation. This condition would normally exist after a rewind without interlock operation or after a tape has been manually loaded in the Magnetic Tape Unit and the main interlock switch has been pressed ON. The absence of both the FIR and BIR signals indicates that the Magnetic Tape Unit being selected is unavailable to perform an operation either because it is already performing an operation or because it requires operator intervention to make it available for such operation.

(5) Rewind interlock: This signal is sent to the Control Unit if the Central Processor specified a Magnetic Tape Unit that is in the process of rewinding.

(6) Pick-up lines: Six Interface Lines provide signals for the Magnetic Tape Unit initial conditioning. They are:

(a) FORWARD PICK-UP;
(b) BACKWARD PICK-UP;
(c) READ PICK-UP;
(d) WRITE PICK-UP;
(e) REWIND PICK-UP; and
(f) REWIND-INTERLOCK PICK-UP (7) Center drive clutch: This signal activates the center drive clutch circuit.

(8) Read clear: This signal deactivates the read circuits of all Magnetic Tape Units simultaneously.

(9) Write clear: This signal deactivates the write circuits in all Magnetic Tape Units simultaneously.

(10) Write test: This signal sent to the Control Unit indicates that the write circuitry in the selected Magnetic Tape Unit has been activated.

(11) Write clutch test: This signal, sent to the Control Unit, indicates the center drive clutch is engaged and the write circuitry is activated in the selected Magnetic Tape Unit.

(12) Magnetic tape unit reading forward: This signal, sent to the Control Unit, prior to engaging the center drive clutch, indicates that the read and the forward tape circuitry in the selected Magnetic Tape Unit has been activated.

(13) Magnetic tape unit reading backward: This signal, sent to the Control Unit, prior to engaging the center drive clutch, indicates that the read and backward tape circuitry in the selected Magnetic Tape Unit are activated.

(14) Magnetic tape unit writing forward: This signal, sent to the Control Unit, prior to engaging the center drive clutch, indicates that the write and forward tape circuitry in the selected Magnetic Tape Unit are activated.

(15) Tape sector select lines: These twelve lines are used in the selection of one of the sectors of the magnetic tape of the selected Magnetic Tape Unit.

CHANNEL SYNCHRONIZER

FIG. 12 is a general logical block diagram of the Channel Synchronizer 18. A description of the major logical blocks is as follows:

A. word register: The word register 200 of the Channel Synchronizer 18 consists of two 30-bit registers, the assembly A register 202 and the disassembly D register 204. This feature allows the Channel Synchronizer to operate on the words stored in the D register 204 while the next word is retained in the A register 202. During output transfers the words enter through the A register 202 and are then stored in the D register 204 for disassembly. During input transfers, words are assembled into the A register 202 and then transferred into the D register 204 and held for the Central Processor 10. In the event of a status condition the Status Word is assembled and stored in the D register 204 until an INPUT ACKNOWLEDGE signal is received from the Central Processor 10. The upper four bits of the D register 204 do not pass directly to the Central Processor as do the others, but they are routed via the error code register 206. If a STATUS signal occurs, the upper four bits in the D register 204 contain the status code to be transferred to the Central Processor.

B. Disassembly gates: The disassembly gates 208 are composed of five sets of six gates each. Each set gates a certain portion of the word contained in the word register 200 to the Control Unit 20. Each set of gates is enabled by the appropriate count from the character counter 210 thus, then the character counter 210 is at zero, bits $2^{29}$ through $2^{24}$ are made available to the Control Unit 20. When the character counter 210 is stepped to the next count of one, the next high order six bits are sent to the Control Unit 20. This process continues until the character counter 210 is stepped from zero to four at which time the complete word has been transferred. Two types of words are disassembled and transferred to the Control Unit 20; Function Words and output Data Words. Each actual transfer from and to the Control Unit 20 through the bi-directional amplifiers 212 occurs at EXTERNAL FUNCTION 1 (EF1) time for function characters and at RESUME time for output data characters. The bi-directional amplifiers 212 are immediately preceded by OR circuits which are referred to in the block diagram as output gates 214. These output gates 214 pass data to the bi-directional amplifiers 212 and during a search operation pass the identifier characters to the character register 216.

C. Assembly gates: The assembly gates 209 are composed of five sets of six gates, each set being qualified by a different count from the character counter 210. If the Magnetic Tape Unit 16 is reading data in a reverse or backward direction the data enters the Channel Synchronizer 18 in reverse character order. By setting the Channel Synchronizer 18 direction control to the backward state, the Character Counter 210 is conditioned to count in reverse (4 to 0) thus placing the data in the word register 200 in the same order as the forward direction would. The data reaches the assembly gates 209 via the bi-directional amplifiers 212 and the character register 216.

D. Function code register: A Function Word from the Central Processor 10 is placed into the word register 200 and then disassembled and passed to the Control Unit 20. The function code portion of the Function Word is retained by the Channel Synchronizer 18 to promote congruous operation between the Control Unit 20 and the Channel Synchronizer 18 for the specified function. Specifically, the Function Word is placed on the data line to the Channel Synchronizer 18 and as the EXTERNAL FUNCTION 1 (EF1) signal from the Central Processor is received, the Function Word is placed in the word register 200 and the function code portion is transferred to the Channel Synchronizer's function code register 218. Thus, the function code portion of the Function Word is contained in the upper six bits of the word register 200 and also is contained in the Channel Synchronizer's function code register 218. Outputs of the function code register pass to the operation storage register 220, where the operation parameters are stored for the duration of the specified function. Function translators in the function code register 218 translate the contents of the function code register to test for any of the special functions such as Bootstrap, Terminate or Request Availability.

E. Operation storage register: The operation storage register 220 stores the translated contents of the function code register 218.

F. Control signal register: The control signal register 222 stores and transmits control signals between the Central Processor 10 and the Channel Synchronizer 18.

G. Character register: The character register 216 stores the six-bit characters as they are received from the Control Unit 20. The outputs of the character register 216 are ANDed with the proper counts of the Character Counter 210 to assemble the characters into a complete Central Processor word in the A register 202. The character register 216 stores during a search operation the characters as they are read from the tape so that they may be compared character-by-character with the Identifier Word which is stored in the D register 204 of the Channel Synchronizer.

H. Output signal register: The output signal register 224 provides the basis for the communication timing between the Channel Synchronizer 18 and the Control Unit 20.

I. Interrupt code register: The interrupt code register 226 stores the composite error codes of the Channel Synchronizer 18 and the Control Unit 20 previous to sending the status code to the Central Processor 10.

J. Character counter: The character counter 210 is a double rank counter which monitors the number of characters transferred in or out of the Control Unit 20.

N. Compare gates: Two of each set of three gates at the output of the character register 216 function during a search operation as compare gates 228. During a search operation each character from the Control Unit 20 is inserted into the Character register 216 where it is held and compared to the corresponding character in the word register 200.

CONTROL UNIT

FIG. 13 is a general logical block diagram of the Control Unit 20. A description of the major logical blocks is as follows:

A. LS register: The LS register 240 serves as a six-bit register receiving write data characters during an output operation from the Channel Synchronizer 18 for distribution to the selected Magnetic Tape Unit 16 and into various control registers and circuits within the Control Unit as required. During a read data, or input, operation it accepts characters from the selected Magnetic Tape Unit for transfer to the LX register 242.

B. LX register: The LX register 242 stores the write data characters while parity is checked and while the sprocket bit is added. During a read data operation, the parity is checked here with the parity and sprocket bits being removed before transfer to the LT register 244.

C. LT register: During write data operation the LT register 244 receives write data characters from the LX register 242 and stores them until able to write on the tape. During a read data operation, the LT register 244 receives read data characters from the LX register 242 and transfers them to the Channel Synchronizer 18 as required.

E. Parity control: The parity control 246 is associated with the LX register 242. Parity checking occurs both during input and ouput operations. During a write data operation no parity error can be generated. Parity is, however, checked, and if required a parity bit is added. During a read data operation parity is checked and the parity bit removed prior to transfer to the Channel Synchronizer.

F. Transfer control: The transfer control 248 exchanges control signals with the Channel Synchronizer 18. Some of these signals indicate conditions not defined in the function code and some are used to notify the Central Processor 10 by way of the Channel Synchronizer 18 of conditions that exist in the Magnetic Tape Subsystem 12 which will affect system operation. These signals are:

EXTERNAL FUNCTION 2 (EF2)
RESUME
STOP SEARCH
READY
STATUS
END OF BLOCK

There are also three error signal lines which in conjunction with other signal lines are used to identify errors to the Channel Synchronizer. The EF2, RESUME, and READY Lines are used by the transfer control 248 to synchronize Control Unit 20 operation with the Channel Synchronizer 18.

G. Character counter: The character counter 250 counts the character transfers on input and output operations and signals an error when one occurs.

H. Function word control: The function word control 252 distributes the characters of the Function Word as needed. The function code is sent to the function code register 258, the Magnetic Tape Unit select bits are sent to the MTU select register 254, and the sector select bits are sent to the tape sector register 256.

I. MTU select register: The MTU select register 254 stores bits $2^{11}$ through $2^0$ of the Function Word. These bits are used to provide the necessary enables to select the desired Magnetic Tape Unit 16. Selection is accomplished by a "master bit." That is, only the bit position equivalent to the desired Magnetic Tape Unit 16 will contain a 1. All of the other bit positions contain 0's.

J. Function code register: The function code register 258 is a six-bit register which stores the function code during the execution of the function.

K. Function code translator: The function code translator 260 translates the Magnetic Tape Unit 16 functions from the function code and transfers them to the Magnetic Tape Unit 16.

M. MTU control: The MTU control 262 transfers the Magnetic Tape Unit functions from the function code translator 260 to the selected Magnetic Tape Unit 16 and monitors return signals from the Magnetic Tape Units to determine the control sequences.

N. Detection control: The detection control 264 detects the data being read from the selected Magnetic Tape Unit 16, amplifies and shapes it and passes it to the align input control 266.

O. Align input control: During read data operation the align input control 266 gates the data transfer from the LS register 240 to the LX register 242 at the proper time so than random timing of bits due to tape skew is eliminated.

P. Format control: During write data operation, the format control 268 determines the tape leader delay, interblock spaces, and controls the write density; the appropriate pick-up signals as determined by function code translator 260 are coupled to the read/write control 361 to condition the control thyratrons in controller 422.

Q. Tape sector register: The tape sector register 256 stores bits $2^{23}$ through $2^{12}$ of the Function Word. These bits provide the necessary enables to set the desired tape sector number in the selected Magnetic Tape Unit 16 as desigated by the MTU select register 254.

R. Interrupt code register: The interrupt code register 270 provides signals specifying EXTERNAL INTERRUPT, equipment status and error codes. Should errors occur in the system appropriate control gates in the interrupt code register 270 are set passing the code of the highest priority to the Channel Synchronizer 18 which then sends an EXTERNAL INTERRUPT signal to the Central Processor 10.

S. Sprocket control: The sprocket control 272 initiates control signals to the transfer control 248 and the character counter 250 upon sprocket bit detection by the detection control 264 during data read operation and initiates control signals to the LT register 244 by way of the detection control 264 during data write operation.

FUNCTIONS

The operation to be performed by the Magnetic Tape Subsystem 12 is specified by the function code contained in the Function Word originated in the Central Processor 10. This function code is a six-bit character located in the high order six-bits of the Function Word as specified in FIG. 5a. The following paragraphs discuss the transfer of Function Words and Data Words between the Central Processor and the Magnetic Tape Subsystem during input and output operations.

A. Function word transfer: At the initial application of power on or after the completion of an operation, the Channel Synchronizer 18 is in the clear state; that is, the Magnetic Tape Subsystem 12 is ready to perform any operation. To signify this, the Channel Synchronizer 18 sends an OUTPUT DATA REQUEST to the Central Processor 10. To instruct the system to perform an operation, the Central Processor sends a Function Word accompanied by an EF1 signal. The EF1 signal enables the Function Word to be entered into the A register 202 and at the same time initiates a control signal which is coupled to AND gates 230 which allows the high order six-bit character of the Function Word to enter the function code register 218, and which transfers the contents of the A register 202 to the D register 204. After this the Function Word is held in the D register 204 and the A register 202 is cleared. This transfer generates a function code translation pulse which enables the translation of the function code contained in the function code register 218. The Channel Synchronizer 18 is then ready to begin the transfer of the Function Word to the Control Unit 20.

To condition the Control Unit 20 for the receipt of a Function Word, the Channel Synchronizer 18 sends an EF2 signal and the first character of the Function Word to the Control Unit 20. As the character counter 250 is cleared to contain all zeros, the function code i.e., the upper six bits of the Function Word are passed directly from the bi-directional amplifiers 212 by way of LS register 240 to the function code register 258 which also steps the character counter 250 one count. The Control Unit 20 then analyzes the function code in the function code register 258 and sends a READY signal to the Channel Synchronizer 18. As the READY signal is sent to the Channel Synchronizer 18, the Control Unit 20 is cleared to receive the next EF2 signal which will accompany the next six-bit Function Word character from the Channel Synchronizer 18.

Upon receipt of successive EF2 signals from the Channel Synchronizer 18 the character counter 250 transmits gate signals which in turn gate the next character (bits $2^{23}$ through $2^{18}$) to the upper half of the tape sector register 256, the next character (bits $2^{17}$ through $2^{12}$) to the lower half of the tape sector register 256, the next character (bits $2^{11}$ through $2^6$) to the upper half of the MTU select register 254 and the last character (bits $2^5$ through $2^0$) to the lower half of the MTU select register 254.

B. Data word transfer: If an output operation was specified by the Central Processor 10, the Channel Synchronizer 18 has returned an OUTPUT DATA REQUEST signal to the Central Processor 10 and it is ready for the output data. As this is a Data Word transfer, the Central Processor 10 places the Data Word on the output data lines and with this placement simultaneously sends an OUTPUT ACKNOWLEDGE signal to the Channel Synchronizer 18. The OUTPUT ACKNOWLEDGE signal gates the Data Word to the A register 202 after which it is transferred into the D register 204. After the Data Word is placed in the D register 204, the A register is cleared. This transfer generates a RESUME signal which is transmitted to the Control Unit 20 when the Control Unit 20 is transmitting to the Channel Synchronizer 18 a READY signal indicating that the Control Unit 20 is ready to accept the first character of the Data Word. As the RESUME signal is sent to the Control Unit 20, it is also used in the Channel Synchronizer 18 to transfer the first character of data through the bi-directional amplifiers 212 and to step the character counter 210 to the next count. When the next READY signal is received from the Control Unit 20, the next RESUME signal is sent to the Control Unit 20 along with the second character of the Data Word. This operation continues until the character counter 210 makes the transition from the count of 4 to the count of 0. At the time that the character counter 210 switches to 0, the character counter 210 generates an OUTPUT DATA REQUEST signal which is sent to the Central Processor 10. The Central Processor 10 may respond with more data or with a new instruction.

If an input operation was specified by the Central Processor, the system is conditioned to read data from magnetic tape. The Control Unit 20 receives a character of data from the Magnetic Tape Unit, checks the parity of the character and transmits it to the Channel Synchronizer 18 along with the READY signal. The data character passes through the bi-directional amplifiers 212 to the character register 216 and the READY signal enables the Channel Synchronizer 18 to send a RESUME signal back to the Control Unit 20. The RESUME signal indicates to the Control Unit 20 that the data character has been received and that the Channel Synchronizer 18 is ready for the next data character. The READY-RESUME signal transmission continues until the entire data word has been received by the Channel Synchronizer 18. Each data character is gated to its proper place in the A register 202 by the Channel Synchronizer 18 character counter 210. If the input operation specified was a read in the backward direction, the character counter 210 would be conditioned to assemble the data word in the reverse order. When the entire word is in the A register 202 there is generated a gating signal which gates the contents of the A register 202 into the D register 204, and which transmits an INPUT DATA REQUEST signal to the Central Processor 10. This signal notifies the Central Processor 10 that a data word is on the input data lines. When the Central Processor 10 accepts the Data Word, it sends an INPUT ACKNOWLEDGE signal to the Channel Synchronizer 18. This operation is continued until the entire block of data has been read or until the Central Processor 10 stops accepting data.

If the input operation specified by the Central Processor 10 was a search-read operation the Function Word transferred to the Channel Synchronizer 18 is followed by an Identifier Word. This Identifier Word is accompanied by an EF1 to distinguish it from a Data Word. Each word read from the magnetic tape of the selected Magnetic Tape Unit is compared to the Identifier Word held in the Channel Synchronizer 18. When a comparison is made, an INPUT DATA REQUEST signal is sent to the Central Processor 10. When the Central Processor 10 acknowledges the INPUT DATA REQUEST, a normal input data transfer follows.

C. Interrupts and error detection: The system is provided with facilities for interrupting Central Processor 10 operations. These facilities are normal answers to those function codes specifying EXTERNAL INTERRUPT, equipment status and error codes. Should errors occur in the system, the interrupt code register 268 in the Control Unit 20 enables the code of the highest priority to be sent to the Channel Synchronizer 18. In the Channel Synchronizer 18, this code is assembled into a Status Word (the status code is contained in the upper 4 bits of the word). The remaining bits in the word may be in any bit configuration in the Channel Synchronizer 18 A register 202 and D register 204. The Channel Synchronizer 18 then sends an EXTERNAL INTERRUPT signal to the Central Processor 10 signifying that the Status Word is on the input data lines.

MAGNETIC TAPE UNIT

Each Magnetic Tape Unit 16 provides a means for introducing data into the Central Processor 10 and for recording data from the Central Processor 10 for subsequent conversion on an off-line unit of peripheral equipment or for relatively long term storage. Up to twelve Magnetic Tape Units are controlled by the Magnetic Tape Subsystem 12 although the illustrated embodiment of FIG. 1 discloses only four Magnetic Tape Units for the purpose of clarifying the discussion of the present invention. These twelve Magnetic Tape Units are identified by alphabetical letters. The letter corresponding to the master bit position in the MTU select register 254 in Control Unit 20, i.e., master bit position 1 of MTU select register 264, or bit $2^0$ of the Function Word, selects Magnetic Tape Unit A, master bit position 2, or bit $2^1$ of the Function Word, selects Magnetic Tape Unit B, etc.

Each Magnetic Tape Unit is designed to transport a magnetic recording tape past an eight-track read-write head under control of the Magnetic Tape Control Cabinet 74 and to perform the following functions:

A. Receive information from the Magnetic Tape Control Cabinet and record this information on magnetic tape.

B. Read data from the magnetic tape and transmit it to the Magnetic Tape Control Cabinet.

C. Rewind the tape.

D. Position the tape at a designated sector.

Each Magnetic Tape Unit contains controls for receiving and storing instruction signals from the Magnetic Tape Control Cabinet and modifying its own operation or changing its condition in accordance with the signals received. Each Magnetic Tape Unit also informs the Magnetic Tape Control Cabinet of its own operating condition by returning STATUS signals to the Magnetic Tape Control Cabinet.

The Magnetic Tape Control Cabinet exercises control over the associated Magnetic Tape Units through common read and write buses, common AC and DC power lines, and common control and test return buses. A group of Magnetic Tape Units, sharing information and control buses to the Magnetic Tape Control Cabinet, can perform one read operation, one write operation, and any number of rewind and tape position operations simultaneously. The Magnetic Tape Control Cabinet exercises control over the associated Magnetic Tape Units by:

A. Selecting a particular Magnetic Tape Unit.

B. Selecting a particular magnetic tape sector.

C. Evaluating STATUS signals returned by the selected Magnetic Tape Unit to determine its operating condition.

D. Sending instruction signals to the selected Magnetic Tape Unit for the desired operation to be performed.

E. Receiving data read from the magnetic tape by the selected Magnetic Tape Unit and sending this data to the Central Processor or obtaining data from the Central Processor and sending it to the selected Magnetic Tape Unit for recording on magnetic tape.

Of the associated Magnetic Tape Units under control by the Magnetic Tape Control Cabinet only one read or one write operation can be performed at the same time. However, the magnetic tapes on any or all of the other magnetic tape units may be rewound or positioned simultaneously. Once a rewind or tape position operation is initiated by the Magnetic Tape Control Cabinet, this operation continues until the operation is complete without further control by the Magnetic Tape Control Cabinet. The Magnetic Tape Control Cabinet is then free to initiate another operation on a different Magnetic Tape Unit.

The Magnetic Tape Units in the illustrated embodiment of FIG. 1 utilize an eight-track magnetic recording scheme forming an eight-bit character; one track contains a sprocket pulse, one track contains a parity (check-bit) pulse, and the remaining six tracks contain the data. The eight bits forming the character are recorded in parallel and any six-bit code may be recorded.

Data is recorded on the magnetic tape using the return-to-zero recording method at a density of either 125 or 250 characters per inch. A wide range of pulse densities, from 15 to 250 characters per inch, may be read. Data is recorded on the tape in continuous blocks having unrecorded spaces between them to allow for stopping and starting the tape. A data block contains $5n$ characters where $n$ is an integer. The recording density and length of the data blocks and spaces betwen blocks are completely controlled by the Magnetic Tape Control Cabinet under the direction of the Central Processor program.

During a read, write, or rewind operation, the tape travels at a speed of 100 inches per second (nominal). Much of the complexity of the Magnetic Tape Unit is due to the fact that the tape must be quickly accelerated at the start of an operation and quickly decelerated at the end of an operation in order to save time and minimize space between blocks. Rapid acceleration and deceleration of the tape is achieved by use of a tape transport system, including a tape loop box that acts as a tape reservoir. This combination enables rapid acceleration and deceleration of the tape without the burden of the inertia of the heavy tape reels.

BUILDING BLOCK CIRCUITS

To implement the illustrated embodiment of the present invention, it is felt that a description of the basic circuits utilized should be presented. The Magnetic Tape Subsystem uses the binary number system for its internal operations and represents a logical "1" signal by a potential of approximately —3 volts while a logical "0" is represented by a potential of approximately 0 volts.

FIG. 6a illustrates the logic symbol 282 that is utilized to represent a basic Building Block Circuit. This block represents the NOR Circuit, which may have a plurality of input terminals, such as A and B, with a single output terminal, such as C. The truth table of FIG. 6b, with Boolean equations that accompany it, indicate that if a "1" is applied to one or more of the input terminals, the output conductor 283 carries a signal representing a "0." Only with the condition where all of the inputs are "0's" will a "1" appear at the output conductor 283.

FIG. 7a indicates the manner in which two NOR circuits 284 and 286 of the type described above may be interconnected to obtain a bistable multi-vibrator, more commonly called a Flip-Flop. In order to place information into the flip-flop, a "1" is placed on the Set line 288, and to Clear the flip-flop it is necessary to place a "1" on the Clear Line 290. Referring to the truth-table of FIG. 6b, it can be seen that a "1" input on the Clear line 290 will result in a "0" output on conductor 292. This output is also applied as an input on wire 296 to NOR circuit 284. Since a Set and a Clear signal cannot be applied to the input terminals simultaneously, the input on conductor 288 will be held to a "0" so that when it is coupled with a "1" output of NOR circuit 286 the output from NOR circuit 284 will be switched to "1" which appears on wire 294. To Set the flip-flop it is necessary to apply a "1" on Set line 288 while applying a "0" on Clear line 290, thereby resulting in a "0" on output line 294. Since this output is applied as an input on wire 298 to NOR circuit 286, there is caused to be a "1" on output line 292 and the flip-flop is Set.

For purposes of simplifying the logic diagram of this embodiment, the cross coupled NOR flip-flop illustrated in FIG. 7a may be illustrated as shown in FIG. 7b as a single logic symbol 300. The notation FF will be utilized to distinguish this logic element from other types of circuits. The '1' notation at the tip of the input arrow on the Set input line indicates that when a Set signal has been applied, a "0" is present at the true output terminal designated '1' and a "0" is present at the complement output terminal designated '0.' The inverse output condition is present when a Clear signal is applied to the Clear input line disignated at the input with the '0.' As stated previously, the application of a "1" to a flip-flop Set or Clear input line places the flip-flop in a Set or Clear state, respectively, while the application of a "0" thereto has no effect thereon. Also, when a flip-flop is in the Set state it is said to hold a "1," and, conversely, when in the Clear state it is said to hold a "0." Further, if a flip-flop holds a "1" the true signal representation is a "1" and the complement signal representation is a "0," and, conversely, if the flip-flop holds a "0" the true signal representation is a "0" and the complement signal representation is a "1." Thus, if a "1" is applied to the Set input line the flip-flop is Set—holds a "1"—and the true signal representation at the '1' output is a "1" and the complement signal representation at the '0' output is a "0." Conversely, if a "1" is applied to the Clear input line the flip-flop is Cleared—holds a "0"— and the true signal representation at the '1' output is a "0" and the complement signal representation at the '0' output is a "1."

FIG. 8 illustrates the logic symbol 302 that is utilized to represent an AND function which will be utilized in a description of the illustrated embodiment of the present invention. It will be noted that although only two inputs A and B are shown, further inputs to the AND function are allowable. The signal appearing at output conductor 304 will be a "1" only when both inputs A and B are "1's" (—3 volts). In the event that any input line is a "0" (zero volts) the output terminal 304 will yield a "0." The AND circuit will also be referred to as an AND gate.

FIG. 9 illustrates the logic symbol 306 which will be utilized in a description of the illustrated embodiment of the present invention to designate the OR function. Again it will be noted that although only two inputs A and B are illustrated, further inputs may be utilized. This circuit operates such that if either input terminal A or B or both input terminals A and B have a "1" applied, the signal appearing at output conductor 308 will be a "1." Further, if both input terminals A and B have a "0" applied, the signal appearing at output conductor 308 will be a "0."

FIG. 10 illustrates the logic symbol 310 and is utilized to respresent an Inverter Circuit. The operation of this circuit is such that a "1" impressed at input terminal A will yield a "0" at the output conductor 312. Conversely, a "0" impressed at input A will yield a "1" at the output conductor 312.

FIG. 11a is a logic diagram representation of a memory element which is a Toggle or Trigger type flip-flop. The terminology T-FF will be applicable to each such circuit differentiated from the bistable flip-flop (FF) element described in FIG. 7a. When applicable, the Clear line will be shown as a seperate input to the toggle flip-flop. By convention, when NOR circuit 320 provides a "1" output signal on conductor 322, the toggle flip-flop is said to be Cleared. Likewise, when NOR circuit 324 provides a "1" output signal on conductor 326, the toggle flip-flop is said to be Set. In a manner similar to that described for the bistable flip-flop of FIG. 19, the outputs of the respective NOR circuits 320 and 324 are cross-coupled so that the output signal from NOR circuit 320 is applied as an input over conductor 328 to NOR circuit 324, and the output signal of NOR circuit 324 is applied over conductor 330 as an input to NOR circuit 320. To complete the circuit arrangement of the toggle flip-flop it is necessary that the respective output signals also be directed to AND circuits 382 and 334. This is done by coupling the output of NOR circuit 320 with conductor 336 to AND circuit 332, and coupling the output of NOR circuit 324 with conductor 338 to AND circuit 334. The operation of a toggle flip-flop is well known in the art, and is such that when the common input line is energized, it causes a toggle flip-flop to reverse states. This may be distinguished from the flip-flop described in FIG. 5 wherein it requires an energizing signal on one of two possible input lines to cause it change states. For purposes of describing the operation of this illustrative embodiment, assume that NOR circuit 320 is providing a "0" output and NOR circuit 324 is providing a "1" output, (the flip-flop is Set). Next assume that a toggle input (logical "1") is applied to input terminal 340. This signal will be applied simultaneously to AND circuits 332, 334. It will be noted that the "0" output from NOR circuit 320 applied on conductor 336 will disable AND circuit 332; while the "1" output from NOR circuit 324 will be applied on conductor 338 to enable AND circuit 334. This causes a "1" signal to be applied to the delay element 342, and thereafter to NOR circuit 324. From the truth table described in FIG. 4, it will be seen that a "1" input to the NOR circuit, such as NOR circuit 324, will result in a "0" output, irrespective of the input from the other elements. Recalling that input levels are maintained at the "0" level unless pulsed by a "1" signal, the "0" signal now appearing on output line 326 will be applied over cross-coupling conductor 330 as a "0" input to NOR circuit 320. This is, in addition to the other inputs, clamped at the "0" level, which results in all of the inputs being at the "0" level, and causes NOR circuit 320 to be conditioned to provide a "1" pulse at its output terminal 322. It will be noted that the delay of the input pulse induced by delay elements 342, 344 is such that the toggle-input pulse applied at input terminal 340 has returned to its "0" state prior to the effective feedback from the switch circuit to enable the appropriate AND circuit. In addition to the toggle input 340, the toggle flip-flop is provided with a Clear input 346 which is applied to NOR circuit 324, to provide a means for Clearing the toggle flip-flop for an initializing condition. When the Clear input 346 is activated (as by coupling to negative voltage), the "1" causes NOR circuit 320 to be switched to a condition to output a "1," and the toggle flip-flop is Cleared. For purposes of simplifying the logic diagram of this embodiment the cross-coupled NOR toggle flip-flop illustrated in FIG. 11a may be illustrated as shown in FIG. 11b as a single logic symbol 348.

TAPE TRANSPORT SYSTEM—A

With particular attention to FIGS. 14 and 15 there are disclosed a block diagram and a diagrammatic illustration, respectively, of tape transport system 350. Assuming that a reel of tape has been previously manually loaded into the selected Magnetic Tape Unit 16 it is assumed that all the control registers have been cleared and that energizing power is applied through power supply 352 and main interlock 354. The main interlock 354 then couples power to the left and right reel motors 356 and 358, respectively, and to capstan control 360, while power supply 352 energizes the read/write circuits 362 and the read/write heads 364. The Magnetic Tape Control Cabinet 12 then may initiate an operation by coupling the MTU select signal from MTU select register 254 (see FIG. 13) to select-test circuits 366, controller 368 and read/write control 370. If neither a read, a write nor a rewind operation is then being performed by the selected Magnetic Tape Unit the select-test circuit 366 returns the FIR, BIR or RIR signals as appropriate. Tape transport system 350, as particularly defined by FIGS. 14, 19, 20 and 21, is an embodiment of the present invention which implements a Central Processor Instruction Word which directs the Magnetic Tape Subsystem to "Position MTU n at tape sector s".

Controller 368 includes six operation-control thyratrons designated forward, backward, rewind, rewind-interlock, read and write thyratrons, whose control grids are coupled to the MTU select line and whose screen grids are coupled to the respectively named pick-up signal lines. Coincident application of the MTU select signal and a pick-up signal to the corresponding thyratron ignites the thyratron producing the necessary associated control signals. Select test circuit 366 includes means for ANDing the output voltages of the read or write thyratrons of controller 368 with the MTU select signal which if not ANDed—indicating that the read or write controls are not activated—generates the FIR, BIR, or RIR signals as appropriate. If the FIR, BIR and RIR signals indicate that the Magnetic Tape Unit is available to perform the intended operation, the Magnetic Tape Control Cabinet then generates pick-up signals to ignite the proper combination of thyratrons for the intended operation. After the proper combination of thyratrons has been ignited, the Magnetic Tape Control Cabinet turns off the MTU select signal.

If the intended operation is a read/write operation, the Magnetic Tape Control Cabinet initiates tape movement through centerdrive control 372 by coupling a centerdrive clutch signal to read/write control 370 and centerdrive control 372. Centerdrive control 372 then provides the necessary control signals to reel-motor control 374 and capstan control 360. Vacuum control switches 376 associated with left loop box 378b or right loop box 378a (see FIG. 15) provide additional control signals to reel-motor control 374 to compensate for tape loop variations during tape starting and stopping operations. At the end of the read/write operation, the Magnetic Tape Control Cabinet turns off the centerdrive clutch signal which action applies the centerdrive and reel-motor brakes and turns on a read/write clear signal, whichever is appropriate, which in turn extinguishes the corresponding read/write thyratron.

The magnetic tape utilized in the illustrated embodiment of the present invention is of approximately 2,400 feet in length and 0.50 inch wide and has reflective sector markers placed on the surface opposite to the magnetic recording surface. These sector markers determine the sector length which may be variable or fixed as determined by the particular application. Tape movement passes these sector markers past a detector which generates and couples a sector count pulse 380 to the sector count control 382 upon each detection thereof.

Sector count control 382 provides the necessary control signals to tape transport system 350 during a tape sector positioning operation under control of the sector count pulse 380. A tape sector positioning operation is initiated by the Magnetic Tape Control Cabinet which couples the MTU select signal from MTU select register 256 (see FIG. 13) to controller 368 and the desired sector count from tape sector register 256 to sector count control 382. The desired sector count is entered into a desired sector count DS register by the action of the sector count enable from controller 368 which enable is generated by the MTU select signal. The present sector count—the sector count of the sector marker presently under the detector—is held in a present sector count PS register.

A comparator compares the contents of the DS register and the PS register and generates $DS>PS$ (the content of the DS register is larger than the content of the PS register) and $DS<PS$ (the content of the DS register is less than the content of the PS register) signals, as appropriate, and initiates tape movement accordingly. When the contents of the DS register equals the contents of the PS register, the comparator generates a $PS=DS$ signal which causes a MTU Positioned signal to be transmitted to the Magnetic Tape Control Cabinet and a stop signal to be coupled to controller 368 stopping tape movement.

With particular reference to FIG. 15 there is disclosed a diagrammatic illustration of the mechanical aspects of tape transport system 350. Magnetic tape 386 is driven past the read/write head 388 by a centerdrive capstan 390. Centerdrive capstan 390 is coupled to a centerdrive motor by means of a clutch and brake mechanism (not illustrated but included in capstan control 360). The centerdrive motor rotates continuously in a forward or a backward direction as determined by centerdrive control 372 and the clutch and brake mechanism enables the capstan 390 to be started or stopped under the control of the clutch and brake mechanism control circuts included in capstan control 360. Although the tape is transported at a nominal speed of 100 inches per second, the tape transport system 350 enables the tape to be accelerated to full speed or decelerated to a stop in less than 5 milliseconds (ms.). The centerdrive clutch and brake mechanism is controlled by the Magnetic Tape Control Cabinet during read/write operations and by control circuitry in capstan control 360 in tape transport system 350 during rewind operations when initiated by the Magnetic Tape Control Cabinet.

A vacuum system maintains pressure between tape 386 and the read/write head 388 by pulling slack portions of tape 386 between the capstan 390 and the tape reels 392 and 394 into sections of the loop box 378 which serves as a tape reservoir. The vacuum system, which monitors the length of the tape in the loop box sections 378a and 378b, provides a secondary control of the speed of the left reel motor 356 and the right reel motor 358 so that a sufficient length of tape is maintained in sections 378a and 378b to compensate for the differences, during acceleration and deceleration, between the relatively high inertia reel motors and the rapidly accelerating and decelerating centerdrive capstan 390. The vacuum system senses tape 386 loop position through vacuum ports 396 which are placed vertically in each loop box section 378a and 378b and which in turn operate vacuum switches 376. Vacuum switches 376 associated with ports 396 below the tape are actuated while those vacuum switches 376 associated with ports 396 above the tapes are not actuated.

The direction in which the tape 386 moves is normally controlled by the Magnetic Tape Control Cabinet. Either tape reels 392 or 394 may serve as the supply or take-up reel depending upon the direction of the tape motion. Before the tape is driven, the supply reel loop box section contains a sufficient reserve of tape so that the tape will not be drawn from the loop box 378 as a result of the capstan 390 accelerating faster than the supply reel. Conversely, the take-up reel loop box section has sufficient room to contain the tape which the take-up reel cannot handle because it accelerates more slowly than the capstan 390. If tape motion in FIG. 15 is from left to right (forward direction) then the initial start condition of the tape loops is indicated by the solid tape line. When the reel motors have accelerated and are maintaining the proper tape speed, the loop balance is reversed to the position indicated by the dashed tape line, to compensate for the differences in deceleration rates. Since both reels are still decelerating after the capstan 390 has completely stopped, the take-up reel requires excess tape in its loop box section and the supply reel loop box section must have reserve room for the tape that will be spilled out by the supply reel. Tape loop balanced positions are controlled by clutch brake signals from centerdrive control 372 which signals are introduced into the vacuum system under control of the Magnetic Tape Control Cabinet.

Each loop box section 378a and 378b has ten vacuum ports 396 that channel the vacuum pressure to a series of ten vacuum switches 376. These ports are places vertically from top to bottom of the respective loop box section. As the tape positions itself between ports, those ports above the tape loop are at room pressure and their associated switches 376 are not actuated. When the centerdrive capstan 390 moves the tape resulting in a change in loop size, the change is detected by the actuation of an adjacent vacuum switch 376. Operation of the vacuum switch 376 causes an output voltage that is a function of loop size. The resultant changes in output voltage cause the reel motor control 374 to adjust the motor current and restore each loop to its correct size. The high and low levels at which the vacuum system pulls the loops are called the upper and lower loop balance points. Under static conditions (capstan 390 not moving but Magnetic Tape Unit alerted with a Forward pickup signal), the real motor brakes are applied. When the capstan 390 is moving tape (brakes are released), the loop size deviates above or below the balance point and the appropriate vacuum switches 376 to detect the change. Reel-out or reel-up current, whichever is required, is then applied to the reel motors 356 or 358 in proportion to the error that exists in the loop position. Reel motor current continues until the loop is restored to its balance point. In a steady running condition, such as a rewind operation, the balance point is not actually reached, and the reel motors run continuously.

With particular reference to FIGS. 16 and 17 there is shown in detail a magnetic tape 386 as used in the present invention. Tape 386 is typically 2,400 feet long and 0.50 inch wide with a magnetic recording surface 400 formed by a coating of magnetizable material. The non-magnetic recording surface 402 may have a smooth shiny surface although a low reflective surface is preferred. Tape sector markers 404 are 1.00 inch long by 0.30 inch wide reflective strips of any suitable material, such as aluminum foil, having the necessary reflective and strength properties and of a thickness so as to permit its free travel through the tape transport system 350. Sector markers 404 would preferably have a first high reflective surface and a second attaching surface having a suitable adhesive attached thereto permitting quick attachment to the tape forming any desirable, variable or fixed, sector lengths between consecutive sector markers 404. It is to be preferred that sector markers 404 be easily attachable to and removable from tape 386 permitting attachment to or removal from tape 386 while tape 386 is installed in the tape transport system 350.

With particular reference to FIG. 18 there is shown a detail of the sector marker detector 410 illustrated in FIG. 5. Detector 410 includes a constant light source 412 and a photocell 414. The operation of the detector 410 is such that upon reflection of the light emitted from light source 412 from the leading edge (forward or backward tape travel) of marker 404, photocell 414 causes amplifier 416 to emit a sector count pulse 380 which is coupled to sector count control 382 (FIG. 14). The reaction time of tape transport system 350 to sector count pulse 380 is such that tape 386 is decelerated to a stop condition in 0.50 inch causing marker 404 to be centered under detector 410.

SECTOR COUNT CONTROL

With particular reference to FIG. 19 there is disclosed a block diagram of sector count control 382 of FIG. 14. As previously discussed, sector count control 382 is a means whereby sector count pulse 380 causes tape transport system 350 to generate position forward, position backward, stop tape and MTU Positioned signals during a tape sector positioning operation. The following discussion shall show how these signals are generated.

Assuming that a reel of tape has been manually loaded into the selected Magnetic Tape Unit 16, it is assumed that all the control registers of sector count control 382 will have been cleared to contain all "0's" and that the main interlock 354 will have been manually switched ON energizing tape transport system 382. Assume that a desired sector count of 000100010—octal 042, decimal 34—which is held in tape sector register 256 of FIG. 13 is to be placed in desired sector count DS register 420. A MTU select signal from MTU select register 254 is coupled to controller 368 which emits a sector count enable signal to AND gates 422. AND gates 422 are then satisfied by the signals representative of the "1's" held in tape sector register 256 and such signals are coupled to DS register 420 and OR gate 424. At this time DS register 420 contains a desired sector count of 000100010 and PS register 426 contains a present sector count of 000000000—it having been cleared after the manual tape reel loading operation. The signals representative of the "1" ANDed at AND gates 422 are ORed at OR gate 424 which upon the presence of a "1" in any one of the desired sector count bit positions couples a gating signal to delay means 428 which in turn provides gating signals to OR gate 430 and AND gates 432 and 434. Delay means 428 provides a delayed gating signal with respect to the signals representative of the desired sector count so as to prevent the transmission of spurious transient signals which might be emitted from comparator 436 upon the insertion of the desired sector count in DS register 420. Comparator 436 then performs a comparison of the contents of DS register 420 and PS register 426 emitting a signal on conductor 438 indicative of a finding $DS>PS$, i.e., that the content of DS register 420 is larger than the content of PS register 426. This signal passes through AND gate 432 to conductor 440 which couples a position forward signal to controller 368 of FIG. 14 and to conductor 442 which causes direction Flip-Flop 444 to emit a tape forward signal on conductor 446. The position forward signal on conductor 440 causes controller 368 to emit a tape forward signal to centerdrive control 372 which in turn activates tape forward movement through reel motor control 374 and capstan control 360. Tape forward movement causes the next sector marker 404—sector 1 marker—to move under the photocell detector 410 (FIG. 18) which couples a sector count pulse 380 to tape forward AND gate 448. AND gate 448 is thus satisfied by sector count pulse 380 and a direction Flip-Flop 444 tape forward output signal which causes an increment signal to be coupled to PS register 426. This signal increments the present sector count by one causing 426 to then contain 000000001.

The above procedure continues until the PS register 426 contains a present sector count of 000100010. This count is compared by comparator 436 to the contents of DS register 420 which contains a desired sector count of 000100010 causing comparator 436 to emit a signal on conductor 450 indicative of a finding $DS=PS$, i.e., that the content of DS register 420 is equal to the content of PS register 426, which signal is coupled to AND gate 452. AND gate 452 is then satisfied by the output of OR gate 430 caused by the output of delay 428 or the delayed sector count pulse 380 from delay 454. The satisfaction of AND gate 452 generates; a clear signal to clear DS register 420 by way of conductor 456; a stop tape signal to stop tape movement due to controller 368 by way of conductor 458; and, a MTU Positioned signal to be transmitted to Central Processor 10 through Magnetic Tape Control Cabinet 12 by way of conductor 460. At this time, tape movement in the designated Magnetic Tape Unit is stopped with sector marker 404 of tape 386 being centered under photocell detector 410 and the Central Processor is informed that the tape position instruction has been completed and that the designated Magnetic Tape Unit is waiting for further instructions. Assuming that a read forward instruction is transmitted next by Central Processor to the designated Magnetic Tape Unit such operation is completed as discussed above with particular reference to FIG. 14. Tape movement is then continued until the next sector marker 404—sector 33 marker—is positioned under photocell detector 410.

Assume that it is now desired to position the tape at sector 5 marker. This means that the tape must be moved backward 28 sectors from the present sector 33 marker. The desired sector count of 000000101 which is held in tape sector register 256 is coupled to AND gates 422. As before, a MTU Select signal from MTU select register 254 is coupled to controller 368 which couples a sector count enable signal to AND gates 422. AND gates 422 are then satisfied by the signals representative of the "1's" held in tape sector register 256 and such signals are coupled to DS register 420 and OR gate 424. At this time, DS register 420 contains a desired sector count of 000000101 and PS register 426 contains a present sector count of 000100011—i.e., sector 33 marker is centered under photocell detector 410. The signals representative of the "1's" ANDed at AND gate 422 are ORed at OR gate 424 which upon the presence of a "1" in any of the desired sector count bit positions couples a gating signal to delay means 428 which in turn provides gating signals to OR gate 430 and AND gates 432 and 434. Comparator 436 then performs a comparison of the contents of DS register 420 and PS register 426 emitting a signal on conductor 462 indicative of a finding $DS<PS$, i.e., that the content of DS register 420 is less than the content of PS register 426. This signal passes through AND gate 434 to conductor 464 which couples a position backward signal to controller 368 and into conductor 466 which causes direction Flip-Flop 444 to emit a tape backward signal on conductor 468. The position backward signal on conductor 464 causes controller 368 to emit a tape backward signal to centerdrive control 372 which in turn activates tape backward movement through reel motor control 374 and capstan control 360. Tape backward movement causes the next sector marker 404—sector 32 marker—to move under the photocell detector 410 which couples a sector count pulse 380 to tape backward AND gate 470. AND gate 470 is thus satisfied by sector count pulse 380 and a direction Flip-Flop 444 tape backward output signal which causes a decrement signal to be coupled to PS register 426. This decrements the present sector count by one causing PS register 426 to then contain 000100010.

The above procedure continues until PS register 426 contains a present sector count of 000000101. This count is compared by comparator 436 to the content of DS register 420 which contains a desired sector count of 000000101 causing comparator 436 to emit a signal on conductor 450 indicative of a finding $DS=PS$, i.e., that the content of DS register 420 is equal to the content of PS register 426, which signal is coupled to AND gate 452. AND gate 452 is then satisfied by the output of OR gate 430 caused by the output of delay 428 or the delayed sector count pulse 380 from delay 454. The satisfaction of AND gate 452 generates; a clear signal to clear DS register 420 by way of conductor 456; a stop tape signal to stop tape movement due to controller 368 by way of conductor 458; and, a MTU Positioned signal to be transmitted to Central Processor 10 through Magnetic Tape Control Cabinet 12 by way of conductor 460. At this time, tape movement in the designated Magnetic Tape Unit is stopped with sector 5 marker of tape 386 being centered under photocell detector 410 and the Central Processor is informed that the tape position instruction has been completed and that the designated Magnetic Tape Unit is waiting for further instructions. Assuming that a read forward instruction is transmitted next by the Central Processor to the designated Magnetic Tape Unit, such operation is completed as discussed above with tape movement continued until the next sector marker 404—sector 6 marker—is positioned under photocell detector 410 and PS register 426 is incremented accordingly.

COMPARATOR

With particular reference to FIG. 20 there is disclosed a block diagram of comparator 436 of FIG. 19. As previously discussed, comparator 436 is the means whereby the contents of DS register 420 and the contents of PS register 426 are compared, generating one of three discrete output signals; $DS=PS$, contents of DS register 420 and PS register 426 are equal; $DS>PS$, content of DS register 420 is greater than the content of PS register 426; $DS<PS$, content of DS register 420 is less than the content of PS register 426. For purposes of simplifying the discussion of the operation of comparator 436 a three-bit comparator is illustrated, although it is to be understood that the 12-bit comparator utilized in the illustrated embodiment of FIG. 19 would operate in a similar manner.

For purposes of this discussion it shall be assumed that DS register 420 and PS register 426 include a plurality of flip-flops, one flip-flop holding the respective ordered bit of the sector count designated by a corresponding number following the symbols DS or PS. Thus, DS register 420 flip-flop holding bit $2^0$ shall be designated DS–0, the flip-flop holding bit $2^1$ shall be designated DS–1 and the flip-flop holding bit $2^2$ shall be designated DS–2. The same convention shall be followed for PS register 426 such that the corresponding flip-flops shall be PS–0, PS–1, and PS–2. Further, the digital information indicative of the content of the respective register bit positions shall be noted as the true or the complement by having a bar over the symbol to designate the complement and not having a bar over the symbol to designate the true. Thus, the true of the bit held in the DS register 420 bit position $2^1$ shall be identified by the symbol DS–1 while the complement shall be identified by the symbol $\overline{DS-1}$. Additionally, it is to be remembered that the binary number system used shall represent a logical "1" by a potential of approximately —3 volts and a "0" by a potential of approximately 0 volts.

Assume as a first example, that DS register 420 contains a desired sector count of 100 (DS–2="1," DS–1="0," and DS–0="0"), octal 4, decimal 4, and that PS register 426 contains a present sector count of 001 (PS–2="0," PS–1="0," and PS–0="1"), octal 1, decimal 1. Thus, comparison of these counts should generate a $DS>PS$ output signal. Inputs DS–2 and $\overline{PS-2}$ to AND gate 480—both being "1"—cause AND gate 480 to couple a "1" to Inverter 482 and OR gate 484. Inverter 482 couples a "0" to one input of AND gate 486 by way of conductor 488 causing AND gate 486 to couple a "0" to OR gate 490. OR gate 484 meanwhile couples a "1" to Inverter 490 and OR gate 492. OR gate 492 in turn couples a "1" to $DS>PS$ line and to OR gate 494 which couples a "1" to Inverter 496 causing a "0" to be coupled to $DS=PS$ line. Inverter 482 meanwhile couples a "0" to AND gate 498 by way of conductor 500 causing AND gate 498 to couple a "0" to OR gate 502. Inputs PS–2 and $\overline{DS-2}$ to AND gate 504—both being "0"—cause AND gate 504 to couple a "0" to OR gate 490 and Inverter 506. As both inputs from AND gate 486 and AND gate 504 to OR gate 490 are "0," OR gate 490 couples a "0" to Inverter 508 and OR gate 502. As both inputs from AND gate 498 and OR gate 490 to OR gate 502 are "0," OR gate 502 couples a "0" to $DS<PS$ line. Thus, $DS>PS$ line is the only line receiving a "1" indicating that the content of DS register 420 is larger than the content of PS register 426.

Assume, as a second example, that DS register 420 contains a desired sector count of 001 (DS–2="0," DS–1="0," and DS–0="1"), and that PS register 426 contains a present sector count of 011 (PS–2="0," PS–1="1," and PS–0="1"). Thus, comparison of these counts should generate a $DS<PS$ output signal. Input DS–2 to AND gate 480—it being a "0"—causes AND gate 480 to couple a "0" to Inverter 482 and OR gate 484. Inverter 482 couples a "1" to AND gate 486 by way of conductor 488 which combines with inputs PS–1 and $\overline{DS-1}$ at AND gate 486 to cause AND gate 486 to couple a "1" to OR gate 490. OR gate 490 in turn couples a "1" to Inverter 508 and OR gate 502 which in turn couples a "1" to $DS<PS$ line and OR gate 494. OR gate 494 couples a "1" to Inverter 496 which couples a "0" to $DS=PS$ line. Meanwhile the Inverter 508 couples a "0" to AND gate 510 by way of conductor 512 causing AND gate 510 to couple a "0" to OR gate 492. Input PS–2 to AND gate 504—it being a "0"—causes AND gate 504 to couple a "0" to OR gate 490 and Inverter 506 which in turn couples a "1" to AND gate 514 by way of conductor 516. Inputs DS–1 and $\overline{PS-1}$ to AND gate 514—both being "0"—cause AND gate 514 to couple a "0" to OR gate 484. OR gate 484 having both of its inputs "0" causes a "0" to be coupled to OR gate 492 whose other input from AND gate 510 is also a "0." OR gate 492 thus couples a "0" to $DS>PS$ line and to OR gate 494. However, as stated above, OR gate 494 has a "1" coupled to it from OR gate 502 causing a "1" to be coupled to Inverter 496 which in turn causes a "0" to be coupled to $DS=PS$ line. Thus, $DS<PS$ line is the only line receiving a "1" indicating that the content of DS register 420 is less than the content of PS register 426.

It can be seen from the above discussion that if the content of DS register 420 is equal to the content of PS register 426 no one of the AND gates 480, 486, 498, 504, 510 or 514 has its AND condition satisfied. Thus, OR gates 492 and 502 will be coupling a "0" to $DS>PS$ line and $DS<PS$ line, respectively, and to OR gate 494 separately. As both inputs to OR gate 494 are "0," OR gate 494 will couple a "0" to Inverter 496 causing a "1" to be coupled to $DS=PS$ line. Thus, $DS=PS$ line is the only line receiving a "1" indicating that the content of DS register 420 is equal to the content of PS register 426.

PRESENT SECTOR COUNT REGISTER

With particular reference to FIG. 21 there is disclosed a block diagram of PS register 426 of FIG. 19. As previously discussed PS register 426 is the means whereby the Magnetic Tape Unit 16 maintains a count of the number of the tape sector which is detected by photocell detector 410. For purposes of simplifying the discussion of the operation of PS register 426, a 3-bit register is illustrated, although it is to be understood that the 12-bit register utilized in the illustrated embodiment of FIG. 19 would operate in a similar manner.

For purposes of this discussion it shall be assumed that PS register 426 includes a plurality of flip-flops, each such flip-flop holding a respective ordered bit of the present sector count each of which ordered bits is designated by a corresponding number following the symbol PS. Thus, the digital data held in PS register 426 FF–520 which holds bit $2^0$ shall be designated PS–0, that held in FF–522 which holds bit $2^1$ shall be designated PS–1 and that held in FF–524 which holds bit $2^2$ shall be designated PS–2. Further, the digital data indicative of the content of the respective ordered bit positions shall be noted as the true or the complement by having a bar over the symbol to designate the complement and not having a bar over the symbol to designate the true. Thus, the true of the bit held in FF–522 shall be identified by the symbol PS–1 while the complement shall be identified by the symbol $\overline{PS-1}$. Additionally, it is to be remembered that the binary number system used shall represent a logical "1" by a potential of approximately —3 volts and a logical "0" by a potential of approximately 0 volts. Further, it is assumed that the delay of the flip-flops of PS register 426 is greater than the width of the increment and decrement signals from AND gate 448 and 470, respectively. Assume, as a first example, that PS register 426 contains a present sector count of 001 (PS–2="0," PS–1="0," and PS–1="1,"), and that a position forward signal has been coupled to controller 368 by way of conductor 440 from comparator 436 initiating forward tape movement. When the leading edge of the next sector marker 404—sector 2 marker—is detected by photocell detector 410 there is generated a sector count pulse 380 which as discussed with regard to sector count control 382 of FIG. 19 causes an increment signal to be coupled to AND gates 526 and 528 by way of conductor 530. As FF–520 holds a "1" it couples a "1" from its true output by way of conductor 532 to AND gates 526 and 534 and a "0" from its complement output by way of conductor 536 to AND gates 528 and 538. Thus, AND gate 626 is the only AND gate which has its AND condition satisfied and it couples a "1" to AND gates 540 and 542 by way of conductor 544 and to the Clear input of FF–520 by way of OR gate 546 clearing FF–520 to hold a "0." Now FF–520 couples a "1" from its complement output by way of conductor 536 to AND gates 528 and 538 and a "0" from its true output by way of conductor 532 to AND gates 526 and 534. Now no AND gate has its AND condition satisfied and no trigger pulse is coupled to FF–520. As FF–522 holds a "0" it coupled a "1" from its complement output by way of conductor 548 to AND gates 540 and 550 and a "0" from its true output by way of conductor 552 to AND gates 542 and 554. Thus, AND gate 540 is the only AND gate which has its AND condition satisfied and it couples a "1" to the Set input of FF–522 by way of OR gate 556 Setting FF–522 to contain a "1." Now FF–522 couples a "1" from its true output by way of conductor 552 to AND gates 542 and 554 and the "0" from its complement output by way of conductor 548 to AND gates 540 and 550. Now no AND gate has its AND condition satisfied and no trigger pulse is coupled to FF–522. The action of coupling the increment signal to PS register 426 has thus incremented the present sector count to 010 from its original 001.

As forward tape movement continues, the next sector marker 404—sector 3 marker—is detected by photocell detector 410 generating a sector count pulse 380 which is coupled to AND gates 526 and 528 by way of conductor 530. As FF–520 holds a "0" it couples a "0" from its true output by way of conductor 532 to AND gates 526 and 534 and a "1" from its complement output by way of conductor 536 to AND gates 528 and 538. Thus, AND gate 528 is the only AND gate which has its AND condition satisfied and it couples a "1" to the Set input of FF–520 by way of OR gate 558 setting FF–520 to hold a "1." Now FF–520 couples a "0" from its complement output by way of conductor 536 to AND gates 528 and 538 and a "1" from its true output by way of conductor 532 to AND gates 526 and 534. Now no AND gate has its AND condition satisfied and no trigger pulse is coupled to FF–520. As FF–522 holds a "1" it couples a "0" from its complement output by way of conductor 548 to AND gates 540 and 550 and a "1" from its true output by way of conductor 552 to AND gates 542 and 554. Now no AND gate has its AND condition satisfied and no trigger pulse is coupled to FF–522. The action of coupling the increment signal to PS register 426 has thus incremented the present sector count to 011 from its original 010.

As forward tape movement continues the next sector marker 404—sector 4 marker—is detected by photocell detector 410 generating a sector count pulse 380 which is coupled to AND gates 526 and 528 by way of conductor 530. As FF–520 holds a "1," it couples a "1" from its true output by way of conductor 532 to AND gates 526 and 534 and a "0" from its complement output by way of conductor 536 to AND gates 528 and 538. Thus, AND gate 526 is the only AND gate which has its AND condition satisfied and it couples a "1" to AND gates 540 and 542 by way of conductor 544 and to the Clear input of FF–520 by way of OR gate 546 clearing FF–520 to hold a "0." Now, FF –520 couples a "1" from its complement output by way of conductor 536 to AND gates 528 and 538 and a "0" from its true output by way of conductor 532 to AND gates 526 and 534. Now, no AND gate has its AND condition satisfied and no trigger pulse is coupled to FF–520. As FF–522 holds a "1," it couples a "0" from its complement output by way of conductor 548 to AND gates 540 and 550 and a "1" from its true output by way of conductor 552 to AND gates 542 and 554. Thus, AND gate 542 is the only AND gate which has its AND condition satisfied and it couples a "1" to AND gates 560 and 562 by way of conductor 564 and to the Clear input of FF–522 by way of OR gate 566 Clearing FF–522 to contain a "0." Now, FF–522 couples a "0" from its true output by way of conductor 552 to AND gates 542 and 554 and a "1" from its complement output by way of conductor 548 to AND gates 540 and 550. Now no AND gate has its AND condition satisfied and no trigger pulse is coupled to FF–522. As FF–524 holds a "0," it couples a "0" from its true output by way of conductor 568 to AND gates 560 and 562 and a "1" from its complement output by way of conductor 570 to AND gates 572 and 574. Thus, AND gate 574 is the only AND gate which has its AND condition satisfied and it couples a "1" to the Set input of FF–524 by way of OR gate 576 setting FF–524 to hold a "1." Now FF–524 couples a "1" from its true output by way of conductor 568 to AND gates 560 and 562 and a "0" from its complement output by way of conductor 570 to AND gates 572 and 574. Now no AND gate has its AND condition satisfied and no trigger pulse is coupled to FF–524 by way of OR gate 578. The action of coupling the increment signal to PS register 426 has thus incremented the present sector count to 100 from its original 011.

Using the above discussion of the incrementation operation of the PS register 426 of FIG. 21 as a basis it is apparent that each decrement signal coupled to conductor 580 will decrement the present sector count held in PS register 424 by a count of one. Additionally, it is also apparent that a clear signal coupled to conductor 582 will be ORed at OR gates 546, 566 and 578 clearing FF–520, 522 and 524, respectively, causing all said flip-flops to hold "0"'s.

TAPE POSITION OPERATION—A

*"Position MTU n at tape sector s"*

As stated previously, the present invention relates to an improved interconnection system of a Central Processor and its associated peripheral equipment whereby the relatively slow operating speed peripheral equipment may be placed under surveillance of peripheral equipment controls by a Central Processor programmable instruction. This permits the peripheral equipment to perform its own surveillance during its relatively low operating speed housekeeping functions without the need for continuous surveillance by the Central Processor. Thus, the Central Processor is permitted to perform its high operating speed functions during the peripheral equipment's surveillance of its own housekeeping functions. Consequently, to better understand the full significance of the present invention, the embodiment of the "Position MTU *n* at tape sector *s*" tape position operation as illustrated in FIGS. 14, 19, 20 and 21, a discussion shall start with the selection of the tape position Instruction Word by the Central Processor and end with the transmission of the MTU Positioned signal from the selected Magnetic Tape Unit.

Assume that the Central Processor is in the process of executing a program stored in main memory 62 (see FIG. 2) and during such process it encounters an Instruction Word having the following form as shown in FIG. 3a.

| | f | | | j* | | k* | | b | | y | | | | | | | | |
|---|---|---|---|---|---|---|---|---|---|---|---|---|---|---|---|---|---|---|
| BIT | 29 | 27 | 26 | 24 | 23 | 20 | 19 | 18 | 17 | 15 | 14 | 12 | 11 | 9 | 8 | 6 | 5 | 3 | 2 | 0 |
| BINARY | 001 | | 011 | | 0010 | | 11 | | 000 | | 000 | | 000 | | 110 | | 100 | | 000 |
| OCTAL | 1 | | 3 | | 2 | | 3 | | 0 | | 0 | | 0 | | 6 | | 4 | | 0 |

As explained in the discussion of the Central Processor designators $f$, $j^*$, $k^*$ and $b$ are transferred into the $Z_U$ register 68 and then into $U_U$ register 84 from where the designators are translated in control translator 86. Translator 86 translates the $f$ designator OP code of 13 as requiring an input/output operation, the $j^*$ designator of 2 is translated as indicating that input/output channel 2 is to be utilized for the transfer of the function word, and the $k^*$ designator of 3 is translated as indicating that the $y$ designator of 640 is the memory address of the Function Word which is to be transmitted on channel 2. A designator $y$ of 640 is transferred to the $Z_L$ register 70, into the $U_L$ register 82 and then into address translator 66 where it is translated and the contents of memory 62 address 640 are transferred into $Z_L$ register 74.

The Function Word stored in memory 62 address 640 may have the following form as shown in FIG. 5a.

also steps the character counter 210 one count. The Control Unit 20 then analyzes the function code in the function code register 258 and sends a READY signal to the Channel Synchronizer 18 and a tape position signal to Magnetic Tape Unit B by way of format control 268 and read/write control line 754. As the READY signal is sent to the Channel Synchronizer 18, the Control Unit 20 is cleared to receive the next EF2 signal which will accompany the next 6-bit Function Word character from the Channel Synchronizer 18. Upon receipt of successive EF2 signals from the Channel Synchronizer 18, the character counter 210 transmits gate signals which in turn gate the next character (bits $2^{23}$ through $2^{18}$) to the upper half of the tape sector register 256, the next character (bits $2^{17}$ through $2^{12}$) to the lower half of the tape sector register 256, the next character (bits $2^{11}$ through $2^6$) to the upper half of the MTU select register 254 and the last character

| | Function Code | | | Sector Select Bits | | | | | | | | MTU Select Bits | | | | | | |
|---|---|---|---|---|---|---|---|---|---|---|---|---|---|---|---|---|---|---|
| BIT | 29 | 27 | 26 | 24 | 23 | 21 | 20 | 18 | 17 | 15 | 14 | 12 | 11 | 9 | 8 | 6 | 5 | 3 | 2 | 0 |
| BINARY | 001 | | 111 | | 000 | | 000 | | 001 | | 010 | | 000 | | 000 | | 000 | | 010 |
| OCTAL | 1 | | 7 | | 0 | | 0 | | 1 | | 1 | | 0 | | 0 | | 0 | | 2 |

As explained in this discussion of the Magnetic Tape Subsystem 12, the function code—bits $2^{22}$–$2^{24}$—defines the function to be performed which in this assumed case is a function code of 17 indicating that a tape positioning function is to be performed, the sector select bits—bits $2^{23}$–$2^{12}$—defines the tape sector to which the tape of the selected Magnetic Tape Unit is to be positioned and the MTU select bits—$2^{11}$–$2^{10}$—defines the particular Magnetic Tape Unit which is to be selected. This Function Word is then coupled to the output data lines 590 of channel 2 through C0-register 32 and line drivers 32 and concurrently an EF1 signal is coupled to control lines 592 through priority and access control 50 informing the Magnetic Tape Subsystem 12 that the information on channel 2 output data lines is a Function Word—not a Data Word.

The EF1 signal on control lines 592 enables the Function Word to be entered into the A register 202 (see FIG. 12) and at the same time initiates a control signal which is coupled to AND gates 230 which allows the high order 6-bit character of the Function Word to enter the function code register 218, and which transfers the contents of the A register 202 to the D register 204. After this the Function Word is held in the D register 204 and the A register 202 is cleared. This transfer generates a function code translation pulse which enables the translation of the function code contained in the function code register 218. The Channel Synchronizer 18 is then ready to begin the transfer of the Function Word to the Control Unit 20.

To condition the Control Unit 20 for the receipt of a Function Word, the Channel Synchronizer 18 sends an EF2 signal and the first character on the Function Word to the Control Unit 20. As the character counter 210 is cleared to contain all "0's", the function code, i.e., the upper 6 bits of the Function Word, is passed directly from the bi-directional amplifiers 212 by way of LS register 240 (see FIG. 13) to the function code register 258 which (bits $2^5$ through $2^0$) to the lower half of the MTU select register 254. At this time the MTU select register 254 contains the octal number 0002 indicating that Magnetic Tape Unit B is selected for the tape positioning operation and the tape sector register 256 contains the octal number 0012 indicating that the magnetic tape in the Magnetic Tape Unit B is to be positioned at sector marker 10.

The Control Unit 20 at this time couples the following signals to the tape transport system 350; the MTU select signal from MTU select register 254 activating select test circuits 366, read/write control 370 and controller 368; the tape position signal from format control 268 to read/write control 370 extinguishing the forward/backward control thyratrons and the sector count signals from the tape sector register 256 to sector count control 382. Initially, the tape position signal extinguishes the forward/backward control thyratrons in controller 368 so as to place tape movement under initial control of the sector count control 382 while the MTU select signal places the selected Magnetic Tape Unit B into an initialized condition necessary for the execution of the tape position operation. Concurrently, the sector count is entered into the desired sector count DS register 400 and ORed at OR gate 424 into the gating circuits through the sector count enable of AND gate 424 from controller 368. With the magnetic tape 386 having been previously manually loaded into Magnetic Tape Unit B and initially positioned on its leader portion, the present sector count PS register 426 holds a present sector count of 0000 (octal) and the desired sector count DS register 420 holds a desired sector count of 0012 (octal). As explained in detail as regards the previous discussion of FIGS. 19, 20 and 21, comparator 436 compares the content of DS register 420 to the content of PS register 426 and generates a $DS>PS$ signal producing a position forward signal on conductor 440. The position forward signal initiates the forward tape movement through controller 368 which forward tape movement enables detector 410 to detect the sector markers 404 on tape 386. These sector markers 404 provide the necessary manifestations, or identifications, of the corresponding sectors which are interpreted, or counted, as increment signals by PS register 426 causing the PS register 426 to maintain correspondence between the present sector count held in PS register 426 and the sector markers detected by detector 410. This tape movement and the corresponding updating of the present sector count continues until comparator 436 determines that the content of DS register 420 is equal to the content of PS register 426 whereupon comparator 436 generates a $DS=PS$ signal on conductor 450. The $DS=PS$ signal generates a clear signal which clears the DS register 420, a stop tape signal which is coupled to controller 468 which extinguishes the forward thyratron stopping tape movement through center-drive control 372, reel-motor control 274 and capstan control 360 and an MTU Positioned signal which is coupled to Central Processor 10 by way of Magnetic Tape Control Cabinet 14 and is interpreted by Central Processor 10 as indicating that Magnetic Tape Unit B is positioned at the designated tape sector and is ready for the next instruction.

TAPE TRANSPORT SYSTEM B

With particular attention to FIGS. 22 and 23 there is disclosed a block diagram of tape transport system 600. Tape transport system 600, which is an additional embodiment to that of tape transport system 350 of FIG. 14, implements a Central Processor Instruction Word which directs the Magnetic Tape Subsystem 12 to "Position MTU $n$ forward/backward $s$ tape sectors." Tape transport system 600 of FIG. 21 is considered to be a modification of the tape transport system of FIG. 14 wherein the essential change is embodied in the sector count control 602. Similar items of FIGS. 14 and 21 are identified by similar reference numbers with FIG. 23 illustrating the block diagram of sector count control 602 of FIG. 22.

As with tape transport system 350 of FIG. 14, tape transport system 600 of FIG. 22 provides the necessary controls during a tape sector positioning operation while under control of the sector count pulse 380. However, as this embodiment implements a "Position MTU $n$ forward/backward $s$ tape sectors" operation, it is apparent that it requires different input signals from Magnetic Tape Control Cabinet 14 than did tape transport system 350. In this embodiment tape transport system 600 receives from Magnetic Tape Control Cabinet 14 the following signals:

(a) MTU select signals from MTU select register 254 for activating the selected Magnetic Tape Unit.

(b) Forward/Backward pick-up signals from format control 268 initiating forward/backward tape movement.

(c) Sector count signals from tape sector register 256 indicating the desired change in the present tape sector position.

Sector count control 602 provides the necessary control signals to tape transport system 600 during a tape sector positioning operation under control of the sector count pulse 380. A tape sector positioning operation is initiated by the Magnetic Tape Control Cabinet which couples the MTU select signal from MTU select register 256 (see FIG. 13) to controller 604 and the sector count from tape sector register 256 to sector count control 602. The sector count is entered into the sector count control 602 by action of the sector count enable from controller 604 which enable is generated by the MTU select signal. Concurrently, the forward/backward pick-up signal is coupled to read/write control 370 which signal ignites the appropriate control thyratron initiating corresponding tape movement. Detector 410 detects the moving tape sector marker 404 generating sector count pulse 380 which is coupled to sector count control 602 and which decrements the sector count held therein. When the sector count held in sector count control 602 is reduced to zero, it generates a stop tape signal which is coupled to controller 604 which extinguishes the appropriate forward/backward control thyratron stopping tape movement as in tape transport system 350 and an MTU Positioned signal which is coupled to Central Processor 10 by way of conductor 460.

SECTOR COUNT CONTROL

With particular reference to FIG. 23 there is disclosed a block diagram of sector count control 602 of FIG. 22. As previously discussed sector count control 602 is a means whereby sector count pulse 380 causes tape transport system 600 to generate stop tape and MTU Positioned signals during a tape sector positioning operation. The following discussion shall show how these signals are generated.

Assuming that a reel of tape has been manually loaded into the selected Magnetic Tape Unit 16, it is assumed that all the control registers of sector count control 600 will have been cleared to contain all zeros and that the main interlock 352 will have been manually switched ON energizing tape transport system 600. For purposes of simplifying the discussion of the operation of the sector count control 602, a 3-bit register is illustrated, although it is to be understood that the 12-bit register utilized in the illustrated embodiment of FIG. 22 would operate in a similar manner.

For purposes of this discussion it shall be assumed that sector count control 602 includes a plurality of flip-flops, each such flip-flop holding a respective ordered bit of the sector count each of which ordered bits is designated by a corresponding number following the symbol CS. Thus, the digital data held in sector count control 602 FF–606 which holds bit $2^0$ shall be designated CS–0, that held in FF–608 which holds bit $2^1$ shall be designated CS–1 and that held in FF–610 which holds $2^2$ shall be designated CS–2. Further, the digital data indicative of the content of the respective ordered bit positions shall be noted as the true or the complement by having a bar over the symbol to designate the complement and not having a bar over the symbol to designate the true. Thus, the true of the bit held in FF–606 shall be identified by the symbol CS–0 while the complement shall be identified by the symbol $\overline{CS-0}$. Additionally, it is to be remembered that the binary number system used shall represent a logical "1" by a potential of approximately —3 volts and a logical "0" by a potential of approximately 0 volts. Further, it is assumed that the delay of the flip-flops of sector count control 602 is greater than the width of the sector count pulse 380.

Assume as an example that tape sector register 256 holds a sector count of 011 (CS–2="0," CS–1="1" and CS–0="1") and that a forward pick-up signal from format control 268 has been coupled to read/write control 370 initiating forward tape movement. Concurrently, the sector count enable from controller 604 is coupled to AND gates 612, 614 and 616. AND gates 612 and 616 have their AND condition satisfied and they couple a "1" to FF–606 and FF–608 by way of OR gate 618 and OR gate 620, respectively. AND gate 616 does not have its AND condition satisfied and, consequently, it couples a "0" to FF–610 by way of OR gate 622. When the leading edge of the next sector marker is detected by detector 410, there is generated a sector count pulse 380 which is coupled to AND gates 624 and 626 and to delay 628 by way of conductor 629. Delay 628 couples a delayed signal to AND gate 630 which if it has its AND conditions satisfied, couples a stop tape signal to controller 604 and an MTU Positioned signal to Central Processor 10. As the complement outputs of FF–606, FF–608 and FF–610 AND with the output of delay 628, AND gate 630 generates such output signal only when FF–606, FF–608 and FF–610 hold a "1" and when the sector count pulse 380 is coupled to conductor 629. As FF–610 holds a "0," AND gate 630 generates no output signal. As FF–606 holds a "1," it couples a "1" from its true output by way of conductor 632 to AND gate 624 which has its AND condition satisfied by sector count pulse 380 coupled to conductor 629 and thus, couples a "1" to the Clear input of FF–606 by way of OR gate 634 clearing FF–606 to hold a "0." Now, FF–606 couples a "1" from its complement output by way of conductor 636 to AND gates 630 and 626 and a "0" from its true output by way of conductor 632 to AND gate 624. Now, no AND gate has its AND condition satisfied and no trigger pulse is coupled to FF–606. The action of coupling sector count pulse 380 to sector count control 602 has thus decremented the sector count to 010 from its original 011 and has produced no output signal from AND gate 630.

As tape movement continues, the next sector marker is detected by detector 410 generating a sector count pulse 380 which is coupled to AND gates 624 and 626 and delay 628 by way of conductor 629. As FF–606 holds a "0," it couples a "0" from its true output to AND gate 624 by way of conductor 632 and a "1" from its complement output to AND gates 630 and 626 by way of conductor 636. Thus, AND gate 626 is the only AND gate which has its AND condition satisfied and it couples a "1" to the Set input of FF–606 by way of OR gate 618 setting FF–606 to hold a "1." Now, FF–606 couples a "1" from its true output by way of conductor 632 to AND gate 624 and a "0" from its complement output by way of conductor 636 to AND gates 630 and 626. Now, no AND gate has its AND condition satisfied and no trigger pulse is coupled to FF–606. As FF–608 holds a "1," it couples a "1" to the Set input of FF–606 by way of OR gate 618 setting FF–606 to hold a "1." Now, FF–606 couples a "0" from its true output by way of conductor 632 to AND gate 624 and a "1" from its complement output by way of conductor 636 to AND gates 630 and 626. Now, no AND gate has its AND condition satisfied and no trigger pulse is coupled to FF–606. The action of coupling sector count pulse 380 to sector count control 602 has thus decremented the sector count change to 000 from its original 001. Now, the complement outputs of FF–606, FF–608 and FF–610 are "1" which with the output of delay 628 satisfy the AND condition of AND gate 630 causing AND gate 630 to generate the following signals:

(a) A stop tape signal which is coupled to controller 604 causing tape movement to stop;

(b) A MTU Positioned signal which is coupled to Central Processor 10 informing the Central Processor that the designated tape positioning operation has been performed.

TAPE POSITION OPERATION—B
*"Position MTU n Forward/Backward s tape sectors"*

As with the discussion of the "Position MTU n at tape sector s" tape position operation, assume that the Central Processor is in the process of executing a program stored in main memory 62 (see FIG. 2) and during such process it encounters an Instruction Word having the following form as shown in FIG. 3a.

| BIT | f | | j* | | k* | | b | | | | y | | | | | | | |
|---|---|---|---|---|---|---|---|---|---|---|---|---|---|---|---|---|---|---|
| | 29 | 27 | 26 | 24 | 23 | 21 | 20 | 18 | 17 | 15 | 14 | 12 | 11 | 9 | 8 | 6 | 5 | 3 | 2 | 0 |
| BINARY | 001 | | 011 | | 0010 | | 11 | | 000 | | 000 | | 000 | | 010 | | 100 | | 000 |
| OCTAL | 1 | | 3 | | 2 | | 3 | | 0 | | 0 | | 0 | | 2 | | 4 | | 0 | couples a "1" from its true output to AND gate 638 by way of conductor 640 and a "0" from its complement output to AND gates 630 and 642 by way of conductor 644. As AND gate 626 also couples a "1" to AND gates 638 and 642, AND gate 638 is the only AND gate which has its AND condition satisfied. Thus, it couples a "1" to the Clear input of FF–608 by way of OR gate 646 clearing FF–608 to hold a "0." Now, FF–608 couples a "1" from its complement output by way of conductor 644 to AND gates 630 and 642 and a "0" from its true output by way of conductor 640 to AND gate 638. Now, no AND gate has its AND condition satisfied and no trigger pulse is coupled to FF–608. The action of coupling sector count pulse 380 to sector count control 602 has thus decremented the sector count to 001 from its original 010 and has produced no output signals from AND gate 630.

As explained in the discussion of the Central Processor designators f, j*, k* and b are transferred into the $Z_U$ register 68 and then into $U_U$ register 84 from where the designators are translated in control translator 86. Translator 86 translates the f designator OP code of 13 as requiring an input/output operation, the j* designator of 2 is translated as indicating that input/output channel 2 is to be utilized for the transfer of the Function Word, and the k* designator of 3 is translated as indicating that the y designator of 240 is the memory address of the Function Word which is to be transmitted on channel 2. A designator y of 240 is transferred to the $Z_L$ register 70, into the $U_L$ register 82 and then into address translator 66 where it is translated and the contents of memory 62 address 240 are transferred to $Z_L$ register 74.

The Function Word stored in memory 62 address 240 may have the following form as shown in FIG. 5a.

| | Function Code | | Sector Select Bits | | | | | | MTU Select Bits | | | | | | | |
|---|---|---|---|---|---|---|---|---|---|---|---|---|---|---|---|---|---|
| BIT | 29 | 27 | 26 | 24 | 23 | 21 | 20 | 18 | 17 | 15 | 14 | 12 | 11 | 9 | 8 | 6 | 5 | 3 | 2 | 0 |
| BINARY | 001 | | 111 | | 000 | | 000 | | 001 | | 010 | | 000 | | 000 | | 000 | | 010 |
| OCTAL | 1 | | 8 | | 0 | | 0 | | 1 | | 2 | | 0 | | 0 | | 0 | | 2 |

As tape movement continues, the next sector marker is detected by detector 410 generating a sector count pulse 380 which is coupled to AND gates 624 and 626 and delay 628 by way of conductor 629. As FF–606 holds a "1," it couples a "1" from its true output to AND gate 624 by way of conductor 632 and a "0" from its complement output to AND gates 630 and 626 by way of conductor 636. Thus, AND gate 626 is the only AND gate which has its AND condition satisfied and it couples As explained in the discussion of the Magnetic Tape Subsystem 12 the function code—bits $2^{22}$–$2^{24}$—defines the function to be performed which in this assumed case is a function code of 18 indicating that a forward tape positioning function is to be performed—a function code of 19 would indicate that a backward tape positioning function is to be performed—the sector select bits—$2^{23}$–$2^{12}$—defines the change from the present tape sector to a desired tape sector to which the tape of the selected Magnetic Tape Unit is to be positioned and the MTU select bits—$2^{11}$–$2^0$—defines the particular Magnetic Tape Unit which is to be selected. This Function Word is then coupled to the output data lines 590 of channel 2 through C0-register 32 and line drivers 36 and concurrently, an EF1 signal is coupled to control lines 592 through priority and access control 50 (see FIG. 2) informing the Magnetic Tape Control Cabinet 14 that the information on channel 2 output data lines is a Function Word—not a Data Word.

The EF1 signal on control lines 592 enables the Function Word to be entered into the A register 202 (see FIG. 12) and at the same time initiates a control signal which is coupled to AND gates 230 which allow the high order 6-bit character of the Function Word to enter the function code register 218, and which transfers the contents of the A register 202 to the D register 204. After this the Function World is held in D register 204 and the A register 202 is cleared. This transfer generates a function code translation pulse which enables the translation of the function code contained in the function code register 218. The Channel Synchronizer 18 is then ready to begin the transfer of the Function Word to the Control Unit 20.

To condition the Control Unit 20 for the receipt of a Function Word, the Channel Synchronizer 18 sends an EF2 signal and the first character of the Fuction Word to the Control Unit 20. As the character counter 210 is cleared to contain all "0's", the function code, i.e., the upper six bits of the Function Word, is passed directly from the bi-directional amplifiers 212 by way of LS register 240 (see FIG. 13) to the function code register 258 which also steps the character counter 210 one count. The Control Unit 20 then analyzes the function code in the function code register 258 and sends a READY signal to the Channel Synchronizer 18 and a forward tape position signal from format control 268 to read/write control 370. As the READY signal is sent to the Channel Synchronizer 18 the Control Unit 20 is cleared to receive the next EF2 signal which will accompany the next 6-bit Function Word character from the Channel Synchronizer 18. Upon receipt of successive EF2 signals from the Channel Synchronizer 18, the character counter 210 transmits gate signals which in turn gate the next character (bits $2^{23}$ through $2^{18}$) to the upper half of the tape sector register 256, the next character (bits $2^{17}$ through $2^{12}$) to the lower half of the tape sector register 256, the next character (bits $2^{11}$ through $2^6$) to the upper half of the MTU select register 245 and the last character (bits $2^5$ through $2^0$) to the lower half of the MTU select register 254. At this time, the MTU select register 254 contains the octal number 0002 indicating that Magnetic Tape Unit B is selected for the tape positioning operation and the tape sector register 256 contains the octal number 0012 indicating that the magnetic tape in the Magnetic Tape Unit B is to be moved forward 10 sector markers.

The Control Unit 20 at this time couples the following signals to the tape transport system 606; the MTU select signal from the MTU select register 254 activating select test circuits 366, read/write control 370 and controller 604; the forward pick-up signal from format control 268 to read/write control 370 igniting the forward control thyratron and the sector count signals from the tape sector register 256 to sector count control 602. Initially, the forward pick-up signal ignites the forward control thyratron in controller 604 so as to initiate forward tape movement while the MTU select signal places the selected Magnetic Tape Unit B into an initialized condition necessary for the execution of the tape position operation. Concurrently, the sector count is entered into the sector count control 602 through the sector count enable of AND gates 612, 614 and 616 from controller 604. The forward pick-up signal initiates the forward tape movement through controller 604 which forward tape movement enables detector 410 to detect the sector markers 404 on tape 386. These sector markers 404 provide the necessary manifestations, or identifications, of the corresponding sectors which are interpreted, or counted, as decrement signals by sector count control 602 causing the sector count control 602 to decrement the sector count held in sector count control 602. This tape movement and the corresponding updating of the sector count continues until the sector count control 602 determines that the corrected sector count is equal to zero whereupon the sector count control 602 generates the following signals:

(a) A stop tape signal which is coupled to controller 604 which extinguishes the forward control thyratron stopping tape movement through centerdrive control 372, reel-motor control 374 and capstan control 360; and, (b) A MTU Positioned signal which is coupled to Central Processor 10 and interpreted by Central Processor 10 as indicating that Magnetic Tape Unit B is positioned at the designated tape sector and is ready for the next instruction.

While the illustrated embodiment of the present invention has an environment of a stored program Central Processor controlling a plurality of Magnetic Tape Units it is to be understood that the present invention is not to be limited thereto. It is to be understood that suitable mdifications may be made in the structure as disclosed provided such modifications come within the spirit and scope of the appended claims. Having now, therefore, fully illustrated and described our invention, what we claim to be new and desire to protect by Letters Patent is set forth in the appended claims.

What is claimed is:

1. An electronic data processing system for the transport of data storage means on which data is recorded in a plurality of sectors, each of which sectors is defined by a separately identifiable group of recorded data comprising:

master control means and transport means;

said master control means capable of generating a plurality of instruction signals for enabling said transport means to operate independently of said master control means;

said transport means including data storage control means;

said data storage control means including detector means for detecting said sector identifications, present sector means for storing the identification of a sector as determined by said detector means, desired sector means for storing the identification of a desired sector as determined by said instruction signals and comparator means for comparing the identifications of said sectors held in said present sector means and said desired sector means;

said instruction signals causing a desired sector identification to be stored in said desired sector means and enabling said data storage control means to control said data storage means transportation independently of said master control means;

said detector means detecting said sector identifications and modifying the sector identification as stored in said present sector means so as to cause it to agree with the sector identification as determined by said detector means; and, said comparator means comparing the sector identifications stored in said present sector means and said desired sector means and generating comparison signals as a result of said comparison which comparison signals control said data storage means transportation causing said transport means to transport said data storge means such that the sector identification stored in said present sector means is modified by said detector means to equal the identification stored in said desired sector means causing said comparator means to generate a signal stopping said data storage means transportation and informing said master control means that said data storage means is positioned in accordance with said instruction signals.

2. An electronic data processing system for the transport of data storage means on which data is recorded in a plurality of sectors, each of which sectors is defined by a separately identifiable group of recorded data, comprising:

master control means and transport means;
said master control means capable of generating a plurality of instruction signals for enabling said transport means to operate independently of said control means;
said transport means including data storage control means;
said data storage control means including detector means for detecting said sector identifications, present sector means for storing the identification of a sector as determined by said detector means, desired sector means for storing the identification of a desired change to the identification stored in said present sector means as determined by said instruction signals and comparator means for comparing the identifications of said sectors held in said present sector means and said desired sector means;
said instruction signals causing a desired sector identification to be stored in said desired sector means and enabling said data storage control means to control said data storage means transportation independently of said master control means;
said detector means detecting said sector identifications and modifying the sector identifications as stored in said present sector means so as to cause it to agree with the sector identification as determined by said detector means;
said comparator means comparing the sector identifications stored in said present sector means and said desired sector means and generating comparison signals as a result of said comparison which comparison signals control said data storage means transportation causing said transport means to transport said data storage means such that the sector identification stored in said present sector means is modified by said detector means by an amount equal to the identification stored in said desired sector means causing said comparator means to generate a signal stopping said data storage means transportation and informing said master control means that said data record means is positioned in accordance with said instruction signals.

3. An electronic data processing system for the transport of data storage means on which data is recorded in a plurality of sectors, each of which sectors is defined by a separately identifiable group of recorded data, comprising:

master control means and a plurality of substantially similar transport means;
said master control means capable of generating a plurality of instruction signals for enabling any one of said transport means to operate independently of said control means;
each of said transport means including data storage control means;
said data storage control means including detector means for detecting said sector identifications, present sector means for storing the identification of a sector as determined by said detector means, desired sector means for storing the identification of a desired sector as determined by said instruction signals and comparator means for comparing the identifications of said sectors held in said present sector means and said desired sector means;
said instruction signals causing a desired sector identification to be stored in said desired sector means and enabling said data storage control means to control said data storage means transportation independently of said master control means;
said detector means detecting said sector identifications and modifying the sector identification as stored in said present sector means so as to cause it to agree with the sector identification as determined by said detector means;
said comparator means comparing the sector identifications stored in said present sector means and said desired sector means and generating comparison signals as a result of said comparison which comparison signals control said data storage means transportation causing said transport means to transport said data storage means such that the sector identification stored in said present sector means is modified by said detector means to equal the identification stored in said desired sector means causing said comparator means to generate a signal stopping said data storage means transportation and informing said master control means that said data storage means is positioned in accordance with said instruction signals.

4. An electronic data processing system for the transport of a data storage means on which data is recorded in a plurality of sectors each of which sectors is identified by an identifiable sector marker, comprising:

a master control means and a plurality of substantially similar transport means, said plurality of transport means responsively coupled to said master control means;
said master control means capable of coupling a plurality of control signals to a designated one of said plurality of transport means for enabling said designated transport means and for positioning the data storage means of said designated transport means at a designated one of said sectors under control of said designated transport means and independent of any further control of said control means.

5. An electronic data processing system for the transport of magnetic tape on which data is recorded in a plurality of sectors, each of which sector is defined by a separately counted sector marker comprising:

master control means and transport means;
said master control means capable of generating a plurality of instruction signals for enabling said transport means to operate independently of said master control means;
said transport means including tape control means;
said tape control means including detector means for detecting said sector markers, present sector count register means for storing the count of a sector as determined by said detector means, desired sector count register means for storing the count of a desired sector as determined by said instruction signals and comparator means for comparing the counts of said sectors held in said present sector count register means and said desired sector count register means;
said instruction signals causing said tape control means to store the count of the sector as determined by said instruction signals in said desired sector count register means and enabling said tape control means to control said tape transportation independently of said master control means;
said detector means detecting said sector markers and modifying the sector count as stored in said present sector count register means so as to cause it to agree with the sector count as determined by said detector means;
said comparator means comprising the sector count stored in said present sector count register means and said desired sector count register means and generating comparison signals as a result of said comparison which comparison signals control said tape transportation causing said transport means to transport said tape such that the sector count stored in said present sector count register means is modified by said detector means to equal the count stored in said desired sector count register means causing said comparator means to generate a signal stopping said tape transportation and informing said master control means that said tape is positioned in accordance with said instruction signals.

6. An electronic data processing system for the transport of magnetic tape on which data is recorded in a plurality of sectors, each of which sectors is defined by a separated counted sector marker comprising:

master control means and transport means;

said master control means capable of generating a plurality of instruction signals for enabling said transport means to operate independently of said master control means;

said transport means including tape control means;

said tape control means including detector means for detecting said sector markers, present sector count register means for storing the count of a sector as determined by said detector means, desired sector count register means for storing the count of a desired change to the count stored in said present sector count register means as determined by said instruction signals and comparator means for comparing the counts of said sectors held in said present sector count register means and said desired sector count register means;

said instruction signals causing a desired sector count to be stored in said desired sector count register means and enabling said tape control means to control said tape transportation independently of said master control means;

said detector means detecting said sector markers and modifying the sector count as stored in said present sector count register means so as to cause it to agree with the sector count as determined by said detector means;

said comparator means comparing the sector count stored in said present sector count register means and said desired sector count register means and generating comparison signals as a result of said comparison which comparison signals control said tape transportation causing said transport means to transport said tape such that the sector count stored in said present sector count register means is modified by said detector means by an amount equal to the count stored in said desired sector count register means causing said comparator means to generate a signal stopping said tape transportation and informing said master control means that said tape is positioned in accordance with said instruction signals.

7. An electronic data processing system for the transport of a data storage means on which data is recorded in a plurality of separately identifiable sectors of recorded data, comprising:

master control means and a plurality of substantially similar transport means, said plurality of transport means responsively coupled to said master control means;

said master control means capable of generating a plurality of instruction signals for enabling a designated one of said transport means and for positioning the data storage means of said designated transport means at a designated one of said sectors independently of said master control means;

said transport means including data storage control means, detector means for detecting said sector identifications and for generating detection signals as a result of said detection, present sector means for storing the identification of a sector as determined by said detector means, desired sector means for storing the identification of a desired sector and comparator means for comparing the identifications of said sectors held in said present sector means and said desired sector means and generating comparison signals as a result of said comparison;

said detection signals coupled to said present sector means for changing the identifications stored in said present sector means to agree with the changed sector identifications; and, said comparison signals controlling the transportation of said data storage means corresponding to the result of said comparison.

8. An electronic data processing system for the transport of magnetic tape on which data is recorded in a plurality of sectors, each of which sectors is defined by a separately counted sector marker, comprising:

master control means and a plurality of substantially similar tape transport means, said plurality of transport means responsively coupled to said master control means;

said master control means capable of generating a plurality of instruction signals for enabling a designated one of said tape transport means and for positioning the tape of said designated tape transport means at a designated one of said sectors independent of said master control means;

said transport means including tape control means, detector means for detecting said sector markers and for generating detection signals as a result of said detection, present sector count register means for storing the count of a sector as determined by said detector means, desired sector count register means for storing the count of a desired sector and comparator means for comparing the count of said sectors held in said present sector count register means and said desired sector count register means and generating comparison signals as a result of said comparison;

said detection signals coupled to said present sector count register means for changing the count stored in said present sector count register means to agree with the changed sector count; and, said comparison signals controlling the transportation of said tape corresponding to the result of said comparison.

9. An electronic data processing system for the transfer of magnetic tape on which data is recorded in a plurality of sectors each of which sectors is defined by a separately counted light reflective sector marker, comprising:

stored programmable master control means and a plurality of substantially similar tape transport means, said plurality of tape transport means responsively coupled to said master control means;

said master control means capable of generating a plurality of instruction signals for enabling a designated one of said tape transport means and for positioning the tape of said designated tape transport means at a designated one of said sector markers independent of control of said master control means;

said tape transport means including tape control means, photocell detector means for detecting said sector markers and for generating count signals as a result of said detection; present sector register means for storing the count of a present sector as determined by said detector means, desired sector register means for storing the count of a desired sector and comparator means for comparing the counts of said present sector and said desired sector and generating comparison signals as a result of said comparison;

said count signals coupled to said present sector register means for changing the counts stored in said present sector register means to agree with the changed sector count;

said comparison signals including an increment signal for incrementing said present sector count by one, a decrement signal for decrementing said present sector count by one and an equality signal;

said increment signal causing forward tape movement;
said decrement signal causing backward tape movement; and,
said equality signal stopping tape movement and informing said master control means that said tape is positioned according to said instruction signals.

10. An electronic data processing system for the transport of data storage means on which data is recorded in a plurality of sectors, each of which sectors is defined by a separately identifiable group of recorded data comprising:
master control means and transport means;
said master control means capable of generating a plurality of instruction signals for enabling said transport means to operate independently of said master control means;
said transport means including data storage control means;
said data storage control means including detector means for detecting said sector identifications, and desired sector change means for storing the identification of a desired sector change as determined by said instruction signals;
said instruction signals causing a desired sector change identification to be stored in said desired sector change means and enabling said data storage control means to control said data storage means transportation independently of said master control means;
said detector means detecting said sector identifications and modifying the sector identification as stored in said desired sector change means so as to cause it to control said data storage means transportation causing said transport means to transport said data storage means such that the sector identification stored in said desired sector change means is modified by said detector means to equal zero causing said desired sector change means to generate a signal stopping said data storage means transportation and informing said master control means that said data storage means is positioned in accordance with said instruction signals.

11. An electronic data processing system for the transport of data storage means on which data is recorded in a plurality of sectors, each of which sectors is defined by a separately identifiable group of recorded data, comprising:
master control means and a plurality of similar substantially transport means;
said master control means capable of generating a plurality of instruction signals for enabling any one of said transport means to operate independently of said control means;
each of said transport means including data storage control means;
said data storage control means including detector means for detecting said sector identifications, and desired sector change means for storing the identification of a desired sector change to a present sector position;
said instruction signals causing a desired sector change identification to be stored in said desired sector change means and enabling said data storage control means to control said data storage means transportation independently of said master control means;
said detector means detecting said sector identifications and modifying the sector identification as stored in said desired sector change means so as to cause the modification to agree with the sector identification as determined by said detector means; and
said desired sector change means generating modification signals as a result of said modification which modification signals control said data storage means transportation causing said transport means to transport said data storage means such that the sector identification stored in said desired sector change means is modified by said detector means by an amount equal to said desired sector change causing said desired sector change means to generate a signal stopping said data storage means transportation and informing said master control means that said data storage means is positioned in accordance with said instruction signals.

12. An electronic data processing system for the transport of magnetic tape on which data is recorded in a plurality of sectors, each of which sectors is defined by a separately counted sector marker comprising:
master control means and transport means;
said master control means capable of generating a plurality of instruction signals for enabling said transport means to operate independently of said master control means;
said transport means including tape control means;
said tape control means including detector means for detecting said sector markers, desired sector change count register means for storing the count of a desired sector change as determined by said instruction signals;
said instruction signals causing said tape control means to store the count of the sector change as determined by said instruction signals in said desired sector change count register means and enabling said tape control means to control said tape transportation independently of said master control means;
said detector means detecting said sector markers and modifying the sector change count as stored in said desired sector change count register means so as to cause it to agree with the sector change count as determined by said detector means;
said desired sector change count register means generating signals as a result of said modification which modification signals control said tape transportation causing said transport means to transport said tape such that the sector change count stored in said desired sector change count register means is modified by said detector means by an amount equal to the count stored in said desired sector change count register means causing said desired sector change register means to generate a signal stopping said tape transportation and informing said master control means that said tape is positioned in accordance with said instruction signals.

13. An electronic data processing system for the transport of magnetic tape on which data is recorded in a plurality of sectors, each of which sectors is defined by a separately counted sector marker comprising:
master control means and transport means;
said master control means capable of generating a plurality of instruction signals for enabling said transport means to operate independently of said master control means;
said transport means including tape control means;
said tape control means including detector means for detecting said sector markers, and desired sector change count register means for storing the count of a desired change to a present sector position as determined by said instruction signals;
said instruction signals causing a desired sector change count to be stored in said desired sector change count register means and enabling said tape control means to control said tape transportation independently of said master control means;
said detector means detecting said sector markers and modifying the sector change count as stored in said desired sector change count register means so as to cause said modification to agree with the sector change count as originally stored in said desired sector change count register means; and
said desired sector change count register means generating signals as a result of said modification which modification signals control said tape transportation causing said transport means to transport said tape such that the sector change count stored in said desired sector change count register means is modified by said detector means by an amount equal to the count originally stored in said desired sector change count register means causing said desired sector change count register means to generate a signal stopping said tape transportation and informing said master control means that said tape is positioned in accordance with said instruction signals.

14. An electronic data processing system for the transport of magnetic tape on which data is recorded in a plurality of sectors, each of which sectors is defined by a separately counted sector marker comprising:

master control means and a plurality of substantially similar transport means;

said master control means capable of generating a plurality of instruction signals for enabling any one of said transport means to operate independently of said master control means;

each of said transport means including tape control means;

said tape control means including detector means for detecting said sector markers, and desired sector change count register means for storing the count of a desired sector change as determined by said instruction signals;

said instruction signals causing a desired sector change count to be stored in said desired sector change count register means and enabling said tape control means to control said tape transportation independently of said master control means;

said detector means detecting said sector markers and modifying the sector change count as stored in said desired sector change count register means so as to cause it to be decremented to zero; and, said desired sector change count register means generating a signal as a result of said decrementation to zero causing said desired sector change count register means to generate a signal stopping said tape transportation and informing said matster control means that said tape is positioned in accordance with said instruction signals.

15. An electronic data processing system for the transport of a data storage means on which data is recorded in a plurality of separately identifiable sectors of recorded data, comprising:

master control means and a plurality of substantially similar transport means, said plurality of transport means responsively coupled to said master control means;

said master control means capable of generating a plurality of instruction signals for enabling a designated one of said transport means for positioning the data storage means of said designated transport means at a designated one of said sectors independent of said master control means;

said transport means including data storage control means, detector means for detecting said sector identifications and for generating detection signals as a result of said detection, desired sector change means for storing the identification of a desired sector change;

said detection signals coupled to said desired sector change means for decrementing the count stored in said desired sector change means to zero;

said decremented to zero desired sector change means generating a signal stopping the transportation of said data storage means.

16. An electronic data processing system for the transfer of magnetic tape on which data is recorded in a plurality of sectors each of which sectors is defined by a separately counted light reflective sector marker, comprising:

stored programmable master control means and a plurality of substantially similar tape transport means, said plurality of tape transport means responsively coupled to said master control means;

said master control means capable of generating a plurality of instruction signals for enabling a designated one of said transport means and for positioning the tape of said designated tape transport means at a designated one of said sector markers said positioning being free of monitoring by said master control means;

said tape transport means including tape control means, photocell detector means for detecting said sector markers and for generating count signals as a result of said detection, and desired sector change register means for storing the count of a desired sector change to a present sector position;

said count signals coupled to said desired sector change register means for changing the count originally stored in said desired sector change register means to agree with the desired sector count change;

said count signal comprising a decrement signal for decrementing said desired sector change count by one upon the detection of each sector marker; and, said decremented desired sector count change stopping tape movement and providing a signal for informing said master control means that said tape is positioned according to said instruction signals.

References Cited

UNITED STATES PATENTS

| | | | |
|---|---|---|---|
| 2,616,626 | 11/1952 | Lake | 235—61 |
| 2,900,132 | 8/1959 | Burns | 235—61.7 |
| 2,951,232 | 8/1960 | Amdahl | 340—172.5 |
| 3,092,810 | 6/1963 | Schmidt | 340—172.5 |
| 3,142,043 | 7/1964 | Schrimpf | 340—172.5 |
| 3,149,309 | 9/1964 | Schmidt | 340—172.5 |
| 3,192,509 | 6/1965 | Durand | 340—172.5 |

ROBERT C. BAILEY, *Primary Examiner.*

R. B. ZACHE, *Assistant Examiner.*